United States Patent [19]
Blagaila et al.

[11] Patent Number: 5,526,202
[45] Date of Patent: Jun. 11, 1996

[54] DISK DRIVE EMBEDDED SERVO SYSTEM HAVING A SERVO FIELD WITH AN ASYMMETRICAL POSITION SUBFIELD

[75] Inventors: John H. Blagaila, Boulder; James F. Hopper, Louisville; Michael R. Utenick, Englewood, all of Colo.

[73] Assignee: Integral Peripherals, Inc., Boulder, Colo.

[21] Appl. No.: 482,535

[22] Filed: Jun. 7, 1995

Related U.S. Application Data

[63] Continuation of Ser. No. 150,322, Nov. 9, 1993, Pat. No. 5,459,623, which is a continuation of Ser. No. 630,475, Dec. 19, 1990, abandoned.

[51] Int. Cl.$^6$ ............................................. G11B 5/546
[52] U.S. Cl. ................ 360/77.08; 360/135; 360/78.14; 360/48
[58] Field of Search ........................ 360/77.08, 78.14, 360/133, 135, 48

[56] References Cited

U.S. PATENT DOCUMENTS

| | | |
|---|---|---|
| 4,511,938 | 4/1985 | Betts ................................. 360/135 X |
| 4,987,355 | 1/1991 | Leaper et al. ...................... 360/77.07 X |

OTHER PUBLICATIONS

"Quad Burst Servo Needing No Sync ID and Having Added Information," IBM TDB vol. 33 No. 3B pp. 198–200, Aug. 1990.

*Primary Examiner*—Aristotelis Psitos
*Assistant Examiner*—James T. Wilson
*Attorney, Agent, or Firm*—Skjerven, Morrill, MacPherson, Franklin & Friel

[57] ABSTRACT

An embedded servo system for a disk drive is disclosed. An asymmetrical position sub-field reduces the overhead of the disk position system. The sub-field includes at least two normal frame pairs and only one quadrature frame pair interleaved with one of the normal pairs to form the asymmetrical position sub-field. The prerecorded embedded servo information in each track of the disk includes a multiplicity of different length servo fields, i.e, each track includes at least two types of servo fields where the first type has a first length and the second type has a second length that is different from the first length. The length of a servo field refers to the number of prerecorded bytes in the servo field. The multiplicity of different length servo fields includes a first type having a full track address sub-field and a second type having a modulo track address sub-field in place of the full track address sub-field. In another embodiment, the multiplicity of different length servo fields includes the first and second types of servo fields and a third type of servo field. The third type of servo field includes only track following information and no track address information, i.e., the third type of servo field is a position only servo field. The servo fields of differing lengths are interleaved in each track of the disk. The servo fields are chosen to provide a high seek sampling rate in comparison to the required performance and a reduction in the servo overhead. Increased track following sampling is provided to make the read/write head less likely to move off track in response to external forces on the disk drive. Disk drives with different types of servo fields interleaved are particularly well-suited for small portable computers.

5 Claims, 30 Drawing Sheets

FIG. 4A

| AGC | MARK | SYNC | INTG | S/I | POS | FULL ADDRESS |
|---|---|---|---|---|---|---|
| 201 | 202 | 203 | 204 | 205 | 206 | 207 |

| AGC | MARK | SYNC | INTG | S/I | POS | MODULO ADDRESS |
|---|---|---|---|---|---|---|
| 201 | 202 | 203 | 204 | 205 | 206 | 208 |

| AGC | MARK | SYNC | INTG | S/I | POS |
|---|---|---|---|---|---|
| 201 | 202 | 203 | 204 | 205 | 206 |

230 → | MARK 202 | SYNC 203 | INTG 204 | S/I 205 | POS 206 | FULL ADDRESS 207 |

FIG. 4E

240 → | MARK 202 | SYNC 203 | INTG 204 | S/I 205 | POS 206 | MODULO ADDRESS 208 |

FIG. 4F

250 → | MARK 202 | SYNC 203 | INTG 204 | S/I 205 | POS 206 |

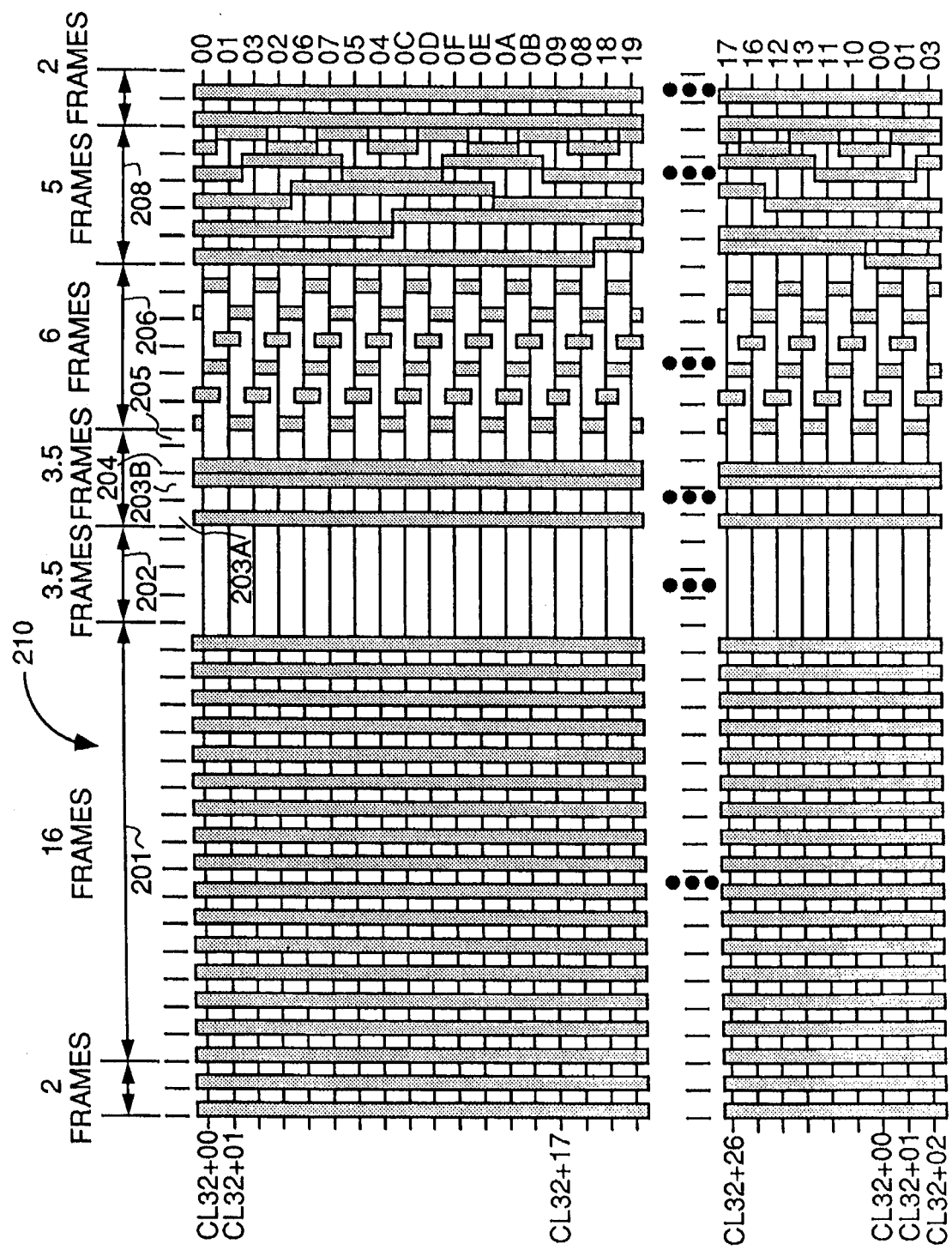

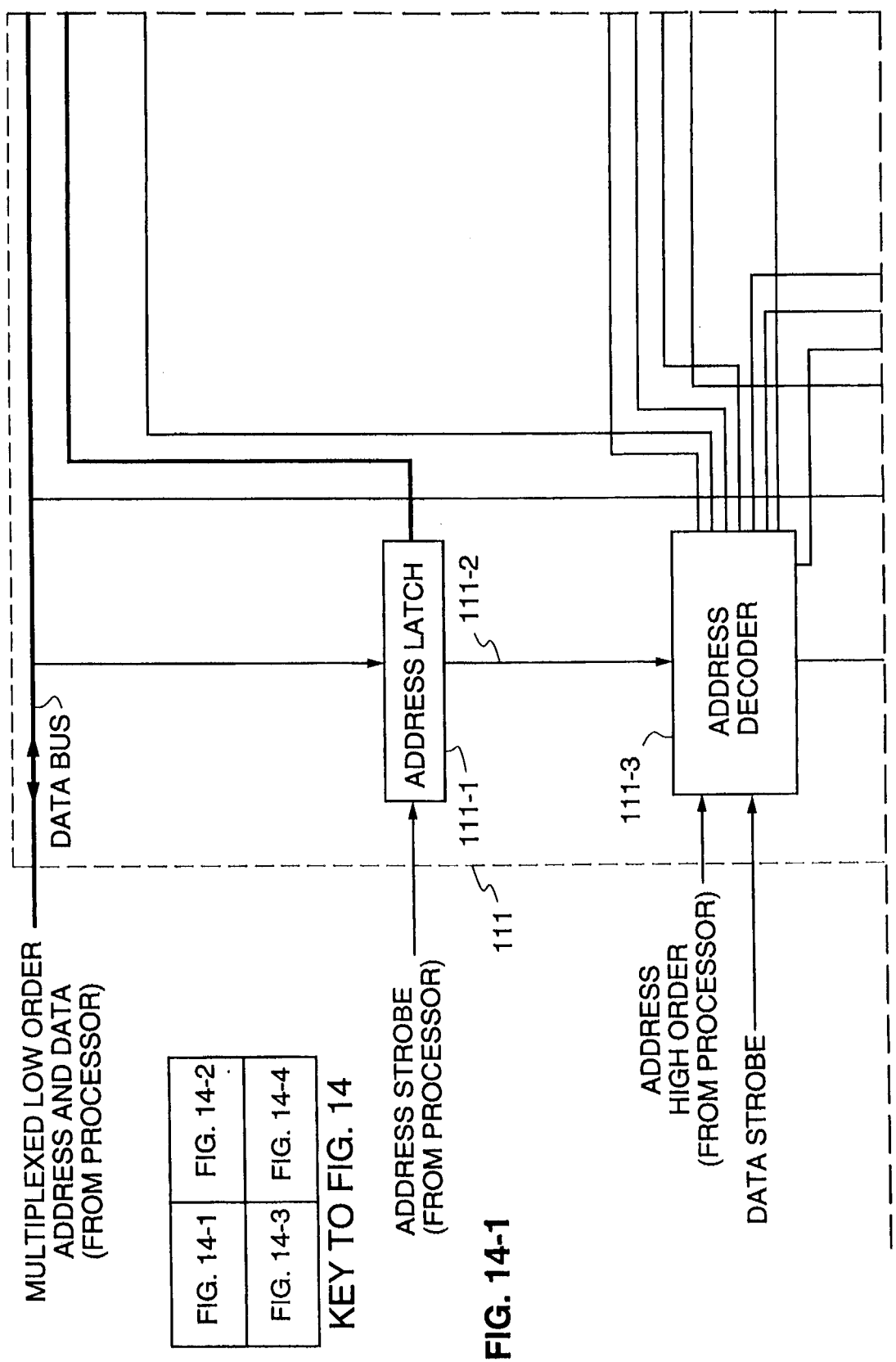

DISK DRIVE EMBEDDED SERVO SYSTEM HAVING A SERVO FIELD WITH AN ASYMMETRICAL POSITION SUBFIELD

This application is a continuation of application Ser. No. 08/150,322, filed Nov. 9, 1993, U.S. Pat. No. 5,459,623, filed Oct. 17, 1995 which was a File-Wrapper Continuation of Ser. No. 07/630,475, filed Dec. 19, 1990, now abandoned.

BACKGROUND OF THE INVENTION

1. Field of the Invention

This invention relates generally to reading and writing data on a magnetic storage medium and in particular to reading and writing data at a predetermined location on a magnetic storage medium by using servo position information embedded within the data.

2. Prior Art

Typically, a disk drive contains one or more circular planar disks that are coated on each side with a magnetic medium. The disk or disks are mounted on a spindle that extends through the center of each disk so that the disks may be rotated at a predetermined speed, usually about 3600 rpm. Usually, one read/write head is associated with each side of the disk that is coated with a magnetic medium. The read/write head flies a small distance above the disk surface as the disk rotates. The read/write head, in response to signals from electronics associated with the disk drive, writes data at a predetermined location in the magnetic medium. Similarly, the read/write head, in response to other signals from the electronics associated with the disk drive, reads the stored data at a predetermined location.

The configuration of the data on the magnetic surface is instrumental in the operation of the disk drive. Data are recorded by the read/write head in concentric circular tracks on the disk. Corresponding tracks on different disk surfaces are cylindrically aligned. Typically, each track is segmented into one or more parts that are referred to as sectors. Thus, the disk drive must move the read/write head across the disk surface to locate the track for reading or writing data and then must follow that track until the desired sector passes under the read/write head. Hence, the read/write head is positioned at a predetermined position over the disk surface.

In a disk drive, each read/write head is usually affixed by an arm to a carriage and the carriage is moved so that the read/write head is positioned over the specified track. This operation is referred to as a track seek, or sometimes just a seek. In an open-loop disk drive, a stepper motor is used to move the carriage while in a closed-loop disk drive a servo system is used to move the carriage.

Many different servo systems have been developed for use in hard disk drives. One type of servo system is an embedded servo system where a servo field identifying the data location is placed in front of each data sector in a track. For example, in U.S. Pat. No. 4,823,212 issued to Knowles et al. on Apr. 18, 1989, each track is divided into an equal number of sectors. Each sector includes a section of servo code, referred to as a servo field, at the beginning of the sector. Each servo field is the same length and includes, starting at its leading edge, a write splice area, an automatic gain control section, a sector mark section, an index sector identifier, a defect bit, a Gray code track number section, and a track position section followed by another write splice area.

The write splice areas are used to compensate for disk rotational speed variations so that the servo code is not overwritten by data. The automatic gain control section is used to normalize the signals from the read/write head so that subsequent servo sections are properly detected and processed. The sector mark section is used to establish a timing reference for the servo signals that follow. The index sector identifier identifies the first sector on each track, i.e., provides an index pulse. The defect bit is used to indicate that the data sector associated with the servo code is defective. The Gray code track number section is a set of magnetic dibits that contain the track address. As is known to those skilled in the art, the track addresses are addresses that are encoded using a Gray code sequence so that any decoding uncertainty is limited to plus or minus one half track. With the Gray code, only one bit in the track address changes from track to track. Finally, the track position section is used to generate signals that are used for track following.

An embedded servo system where each servo field includes a full Gray code track address permits rapid seeks and rapid recovery following a seek error. However, the relatively large servo field limits the amount of data that can be stored in a track.

An alternative to the full Gray code track address in each servo field is to use a different system that has only a modulo track address. In the modulo track address system, the tracks are divided into bands. For a modulo n track address system, each band has tracks numbered from zero to (n–1).

The key to a modulo track address system is (i) having a known reference point from which to start a seek and (ii) keeping an accurate account of the movement of the read/write head from that reference point. The servo system samples at predetermined time intervals as the read/write heads move radially across the disk. During the sampling period, the modulo track address is read by the disk drive electronics. Thus, a track address is available only during the sampling period, but the read/write heads are moving between sampling periods. The disk drive electronics must maintain an accurate count of the number of bands that the read/write heads must traverse to reach the target track.

The disk drive electronics has no means to determine that more than one band has been traversed between consecutive samples. Thus, if the read/write heads move over more than one band during consecutive samples, a seek error occurs. When a seek error occurs, the reference point is lost. The maximum velocity of the read/write head is limited by the number of bits in the modulo track address, because the number of bits determines the number of tracks in a band. The maximum actuator velocity and the number of tracks in a band is selected so that the read/write heads cannot fly over an entire band of tracks during the sample period. Hence, the seek performance of the modulo track address embedded servo system is typically slower than the full track address embedded servo system.

Since the modulo track address is smaller in length than the full track address, the servo field length of the modulo embedded servo system is smaller than the full address embedded servo system. Hence, the modulo embedded servo system provides a reduction in servo overhead in comparison to the full address servo system. However, for both the modulo embedded servo system and the full address embedded servo system, each servo field on the disk has the same length.

Several different approaches have been used in the track position section of the servo field to encode information that results in accurate track following. For examples of track positioning techniques, see U.S. Pat. No. 4,823,212 issued to Knowles et al. on Apr. 18, 1989; U.S. Pat. No. 4,530,019 issued to Penniman on Jul. 16, 1985; U.S. Pat. No. 4,424,543 issued to Lewis et al. on Jan. 3, 1984; and U.S. Pat. No. 4,669,004 issued to Moon et al. on May 26, 1987, which are incorporated herein by reference in their entirety.

As is known to those skilled in the art, some servo systems do not incorporate the automatic gain section described above. However, most disk drives for portable computers having an embedded servo system use the automatic gain section in each servo field on the disk to assure reliable performance of the system. The automatic gain section contributes significantly to the servo overhead.

SUMMARY OF THE INVENTION

Unlike the prior art embedded servo systems where each prerecorded servo field was the same length, the prerecorded embedded servo fields of this invention have differing lengths. In each track, two or more servo fields having different lengths are interleaved. As explained more completely below, the different length servo fields reduce the servo overhead while at the same time providing better seek and track following sampling than prior art modulo track embedded servo systems, for example.

According to the principles of this invention, prerecorded embedded servo information in each track of the disk includes a multiplicity of different length servo fields, i.e, each track includes at least two types of servo fields where the first type has a first length and the second type has a second length that is different from the first length. Herein, the length of a servo field refers to the number of prerecorded bytes in the servo field information where the unit of measure for the length is a byte.

In one embodiment, the multiplicity of different length servo fields includes a first type of servo field having a full track address sub-field and a second type of servo field having a modulo track address sub-field in place of the full track address sub-field. In another embodiment, the multiplicity of different length servo fields includes three types of interleaved servo fields. The first type of servo field and the second type of servo field are the same as described above. A third type of servo field includes only track following information and no track address information, i.e., the third type of servo field is a position only servo field.

In total, according to the principles of this invention, six different servo fields are defined for use in the embedded servo system. The six fields are the three different types of servo fields described above, i.e., the full address servo field, the modulo address servo field and the position only servo field that include an automatic gain control sub-field, and three additional servo fields that are identical to these servo fields without an automatic gain control (AGC) sub-field. The combination of the six fields used in a track determines the seek and track following capability of the disk drive. Moveover, the embedded servo system overhead is reduced in comparison to embedded servo systems that use only a fixed length servo field throughout the disk while at the same time allowing improved sampling rates.

The position sub-field is another novel feature of this invention. According to the principles of this invention, asymmetrical position sub-fields are used to reduce the servo overhead while providing the necessary track following capability. The asymmetrical position sub-field includes a first number of pairs of normal frames and a second number of pairs of quadrature frames where the second number is less than the first number. The normal frames and the quadrature frames are interleaved to form the asymmetrical position sub-field.

A method is provided for designing an embedded servo system having at least two different types of servo fields. The method includes the steps of:

i) selecting a period f that defines the minimum distance between servo fields having a full track address sub-field;

ii) selecting a period m that defines the minimum distance between servo fields having a modulo track address sub-field;

iii) defining a number N of servo fields per track;

iv) determining a number F of of servo fields per track with a full track address sub-field using the number N of servo fields per track and the period f; and v) determining a number M of servo fields per track with a modulo track address sub-field using the number N of servo fields per track and the period m.

BRIEF DESCRIPTION OF THE DRAWINGS

FIG. 4A illustrates one embodiment of a full address servo field with an automatic gain control sub-field according to the principles of this invention.

FIG. 4B illustrates one embodiment of a modulo address servo field with an automatic gain control sub-field according to the principles of this invention.

FIG. 4C illustrates one embodiment of a position only servo field with an automatic gain control sub-field according to the principles of this invention.

FIG. 4D illustrates one embodiment of a full address servo field without an automatic gain control sub-field according to the principles of this invention.

FIG. 4E illustrates one embodiment of a modulo address servo field without an automatic gain control sub-field according to the principles of this invention.

FIG. 4F illustrates one embodiment of a position only servo field without an automatic gain control sub-field according to the principles of this invention.

FIG. 5B illustrates one embodiment of magnetization pattern for a modulo 32 address servo field with an automatic gain control sub-field according to the principles of this invention.

DETAILED DESCRIPTION

Figure 1:
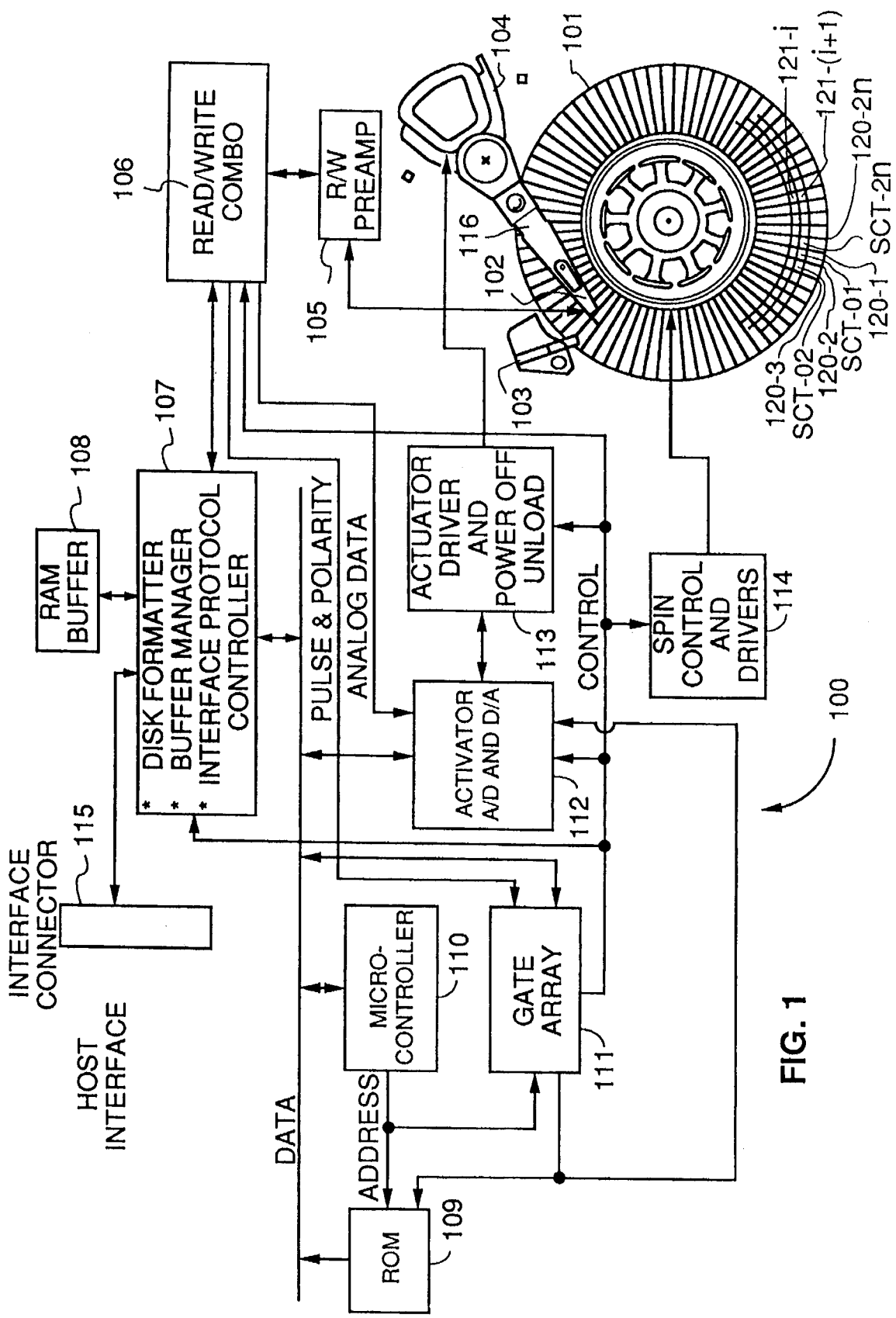
FIG. 1 illustrates a disk drive that includes a disk having the embedded servo system of this invention where the servo fields in a track have different lengths.

According to the principles of this invention, a novel embedded servo system is used in a disk drive 100 (FIG. 1). The interface of a disk drive with a computer system and in particular the electronics required in conjunction with an embedded servo system to read and write data on disks 101 in response to signals from a disk controller to interface connection 115 are known to those skilled in the art. The particular system illustrated in FIG. 1 is described more completely in copending and commonly assigned U.S. patent application Ser. No. 07/629,948 of Morehouse et al. filed on Dec. 19, 1990 and entitled "Miniature Hard Disk Drive For Portable Computers," now abandoned which is incorporated herein by reference in its entirety.

As illustrated in FIG. 1, disk drive 100 contains one or more circular planar disks 101. Each disk is coated on at least one side with a magnetic medium as on the prior art disk. Data are recorded by the read/write head 102 in concentric circular tracks on the disk, e.g. tracks 121-i and 121-(i+1). Corresponding tracks on different disk surfaces are approximately cylindrically aligned.

Each track is segmented into one or more sectors SCT-01, SCT-02, . . . , SCT-2n by prerecorded information in embedded servo field regions 120-1 through 120-2n. Each servo field region 120-j where j=1, 2, . . . , 2n, includes m concentric servo fields, where m is the number of concentric circular data tracks on disk, i.e., one servo field in each data track at position j for a total of 2 nm servo fields per surface. In one embodiment, as described more completely below, disks 101 are 1.89 inches (48 mm) in diameter and have 488 data tracks.

Unlike the prior art embedded servo systems where each prerecorded servo field was the same length, the prerecorded embedded servo fields of this invention have differing lengths. Thus, in each track, two or more servo fields having different lengths are interleaved. As explained more completely below, the different length servo fields reduce the servo overhead while at the same time providing better seek and track following sampling than prior art modulo track embedded servo systems, for example.

According to the principles of this invention, prerecorded embedded servo information in each track of the disk includes a multiplicity of different length servo fields, i.e, each track includes at least two types of servo fields where the first type has a first length and the second type has a second length that is different from the first length. Herein, the length of a servo field refers to the number of prerecorded bytes in the servo field information where the unit of measure for the length is a byte.

In one embodiment, the multiplicity of different length servo fields includes a first type of servo field, referred to as a TYPE A servo field, having a full track address sub-field and a second type of servo field, referred to as a TYPE B servo field, having a modulo track address sub-field in place of the full track address sub-field of the TYPE A servo field. A linear representation of three portions of a representative circular track 121-i having the TYPE A and TYPE B servo fields is presented in FIG. 2.

Figure 2:
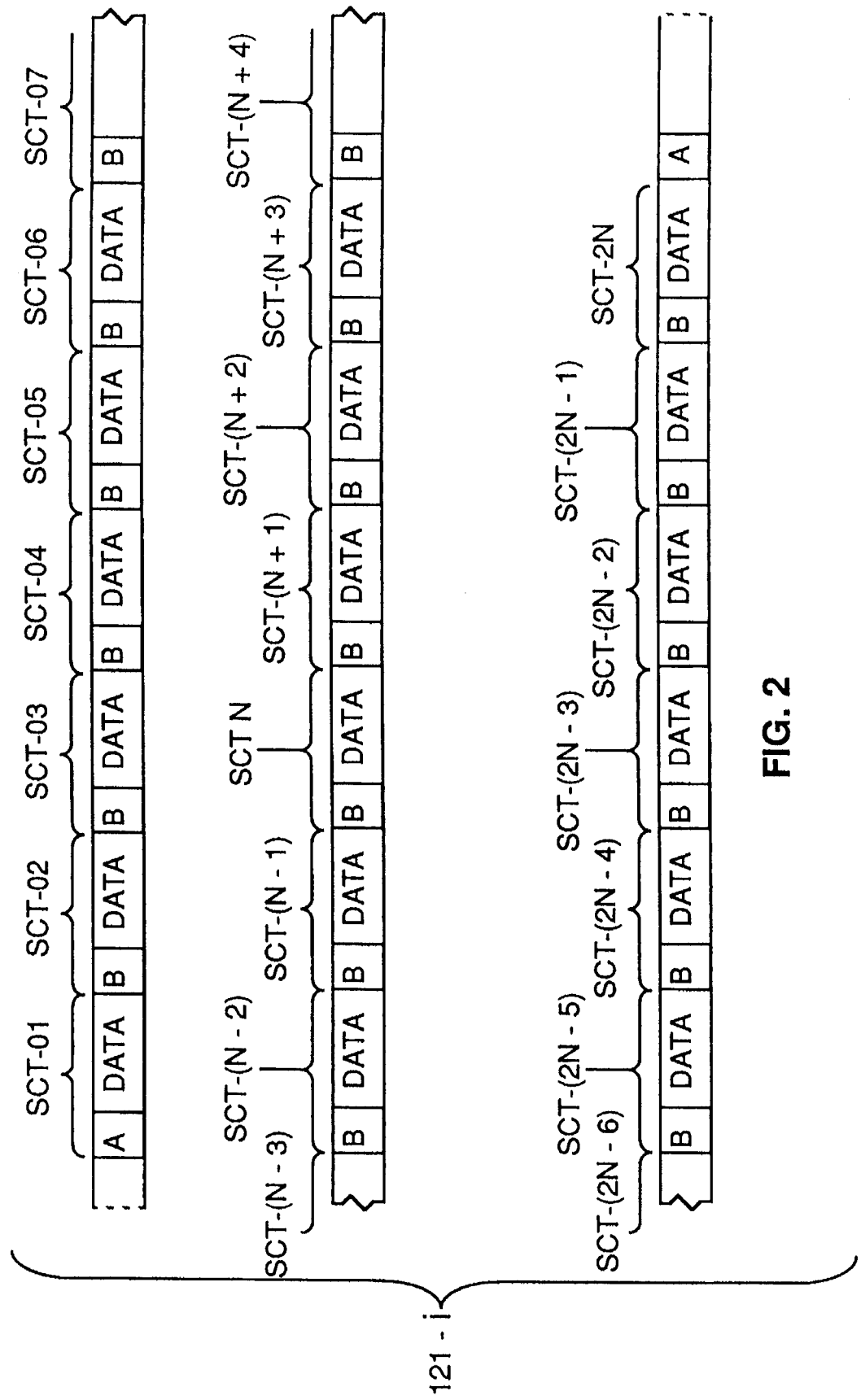
FIG. 2 is a linear representation of three portions of a representative circular track 121-i having interleaved TYPE A and TYPE B servo fields according to the principles of this invention.

Each sector SCT-i, where i=1, 2, ..., 2n, includes either a TYPE A (indicated by "A" in FIG. 2) or a TYPE B (indicated by "B" in FIG. 2) prerecorded embedded servo field and a data region (indicated by "DATA" in FIG. 2). Since the TYPE A servo field has a full track address sub-field and the TYPE B servo field has only a modulo track address sub-field, the TYPE A servo field is longer than the TYPE B servo field. Thus, the servo overhead for track 121-i is less than the servo overhead for a track with all TYPE A servo fields.

In the embodiment of FIG. 2, track 121-i has only one TYPE A servo field interleaved with (2n-1) TYPE B servo fields. In other embodiments, two or more TYPE A servo fields may be used in a track and the remaining servo fields are TYPE B servo fields. In each case, the servo overhead is reduced over an embedded servo system having only TYPE A servo fields, but the one or more TYPE A servo fields with full track address sub-fields, as explained more completely below, enhance the seek performance and the seek error recovery time over a system having only modulo track address servo fields.

In another embodiment, the multiplicity of different length servo fields includes three types of interleaved fields. The first type of servo field, the TYPE A servo field, and the second type of servo field, the TYPE B servo field are the same as described above. A third type of servo field, referred to as a TYPE C servo field, includes only track following information and no track address information, i.e., the third type of servo field is a position only servo field.

Figure 3A:
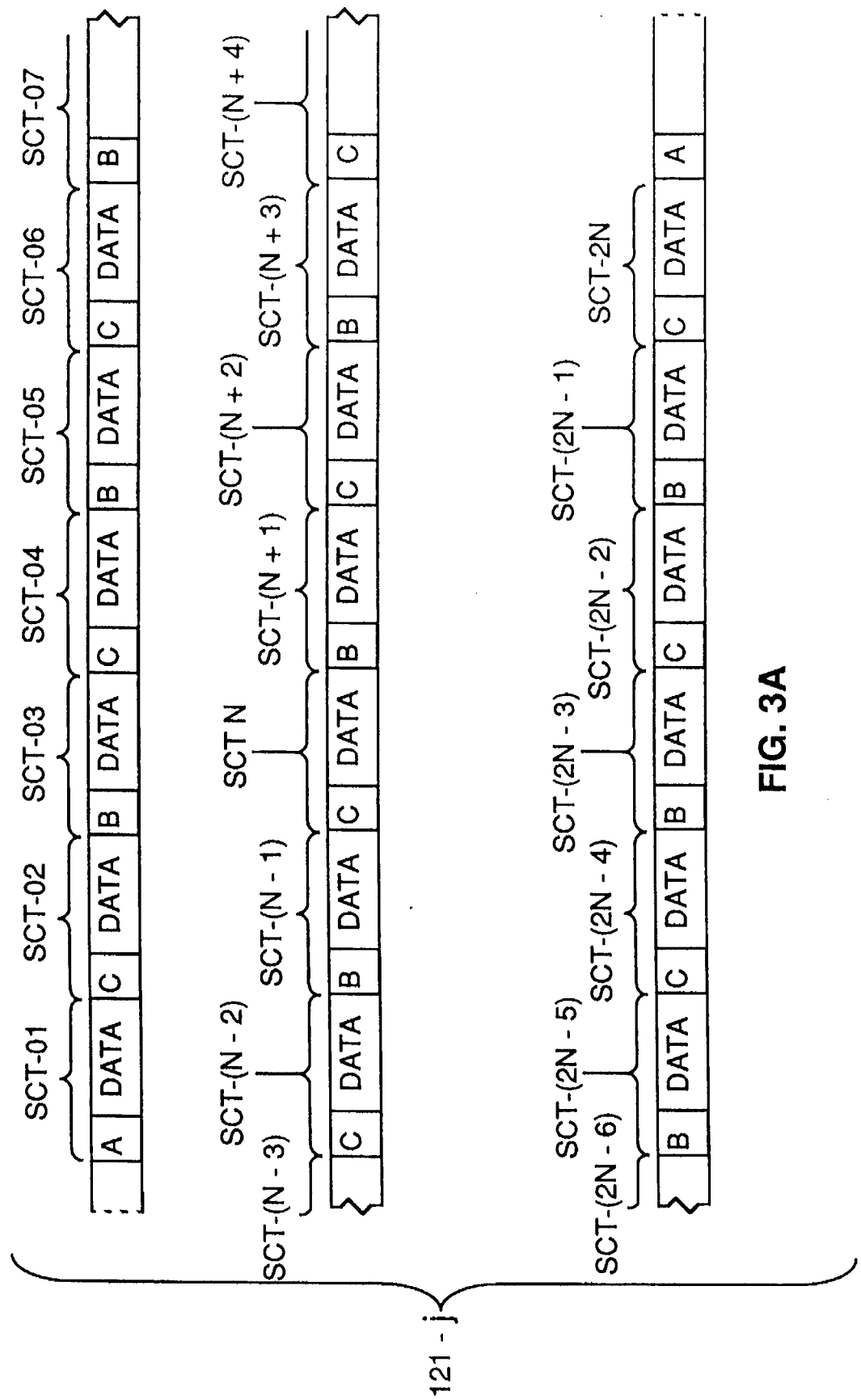
FIG. 3A is a linear representation of three portions of a representative circular track 121-i having one TYPE A servo field, TYPE B modulo servo fields having a 2:1 interleave and TYPE C position only servo fields having a 2:1 interleave according to the principles of this invention.
Figure 3B:
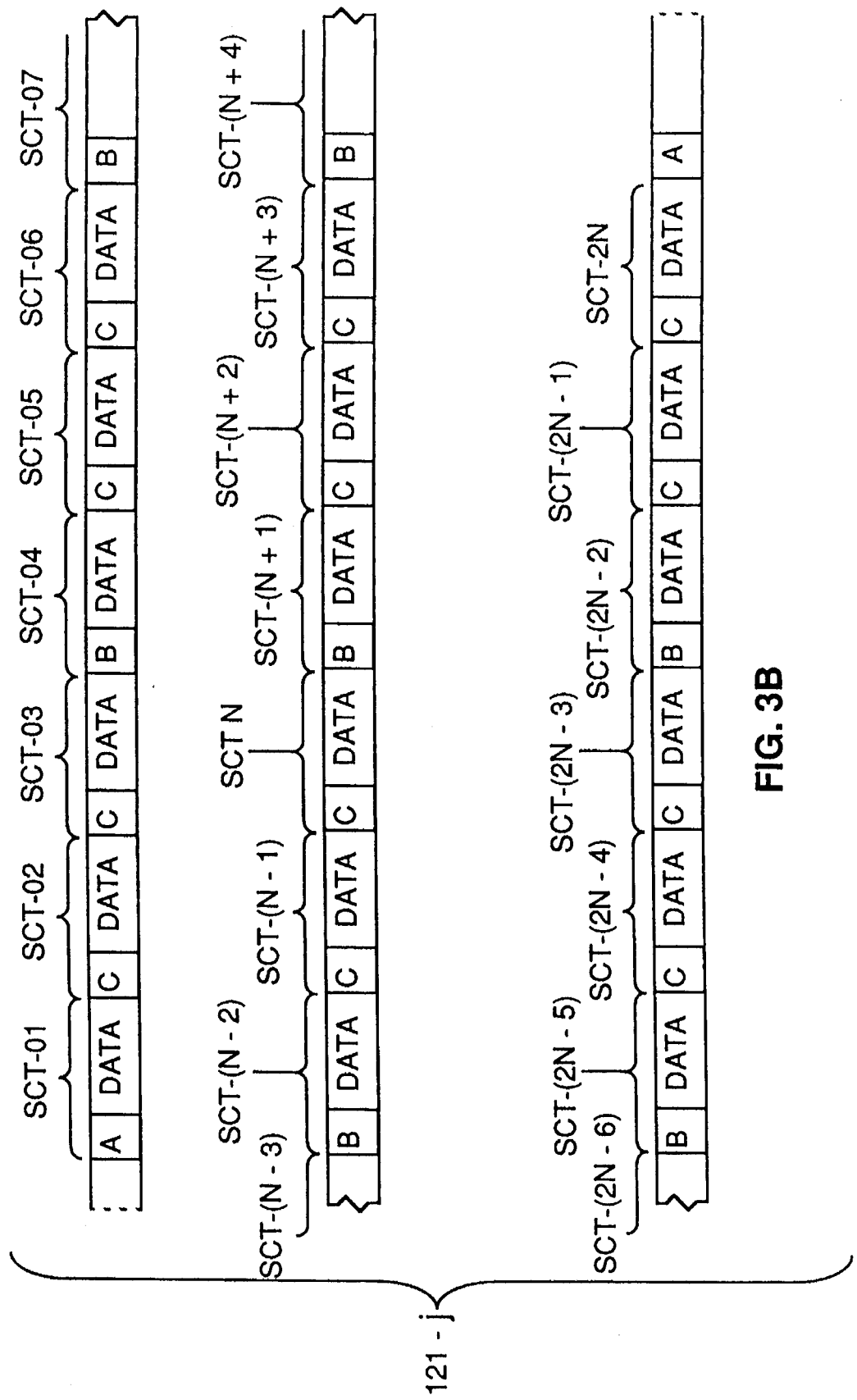
FIG. 3B is a linear representation of three portions of a representative circular track 121-i having one TYPE A servo field, TYPE B modulo servo fields having a 3:1 interleave and TYPE C position only servo fields having a 3:2 interleave according to the principles of this invention.

A linear representation of three portions of a first embodiment of representative circular track 121-j having interleaved TYPE A, TYPE B and TYPE C servo fields is presented in FIG. 3A and a linear representation of three portions of a second embodiment of representative circular track 121-j having interleaved TYPE A, TYPE B and TYPE C servo fields is presented in FIG. 3B. Each sector SCT-i, where i=1, ..., 2n, includes either a TYPE A (indicated by "A" in FIGS. 3A and 3B), a TYPE B (indicated by "B" in FIGS. 3A and 3B), or a TYPE C (indicated by "C" in FIGS. 3A and 3B) prerecorded embedded servo field and a data region (indicated by "DATA" in FIGS. 3A and 3B). Since the TYPE A servo field has a full track address sub-field, the TYPE B servo field has only a modulo track address sub-field, and the TYPE C servo field has no address sub-field, the TYPE A servo field is longer than the TYPE B servo field which in turn is longer than the TYPE C servo field. Thus, the servo overhead for track 121-j (FIGS. 3A and 3B) is less than either the servo overhead for a track with all TYPE A servo fields or the servo overhead for track 121-i (FIG. 2).

The total number of TYPE A and B servo fields per track, i.e., the servo fields with track address information, gives the sampling rate for seeks. The total number of TYPE A, B and C servo fields per track, i.e., the servo fields with track following information, gives the sampling rate for track following. Thus, the use of TYPE C servo fields trades off seek sampling rate for reduced servo overhead while maintaining high on track sampling which gives the read/write head better immunity to being pushed off track.

According to the principles of this invention, six different servo fields are defined for use in the embedded servo system. The six fields are the three different types of servo fields described above, i.e., the TYPE A, B, and C servo fields that include an automatic gain control sub-field, and three additional servo fields, TYPES D, E and F, that are identical to the TYPE A, B, and C servo fields respectively without an automatic gain control (AGC) sub-field. As described more completely below, the combination of the six fields used in a track determines the seek and track following capability of the disk drive. Moveover, the embedded servo system overhead is reduced in comparison to embedded servo systems that use only a fixed length servo field throughout the disk while at the same time allowing improved sampling rates.

The first type of servo field, referred to the TYPE A servo field 200 (FIG. 4A), is a full track address servo field. TYPE A servo field 200 is the largest field used in this invention and includes, in one embodiment, seven sub-fields which are: 1) an automatic gain control sub-field 201; 2) a start mark sub-field 202; 3) a synchronization frame and type sub-field 203; 4) an integrity check sub-field 204; 5) a sector/index sub-field 205; 6) a position sub-field 206; and 7) a full Gray code address sub-field 207. In addition to the seven sub-fields 201 to 207, TYPE A servo field 200 typically includes a write splice sub-field at the start and the end of field 200. The function of each sub-field is described more completely below.

A TYPE D servo field 230 (FIG. 4D) is the same as TYPE A servo field 200 (FIG. 4A), except TYPE D servo field 230 does not have AGC sub-field 201. Thus, TYPE D servo field 230 provides the same information as a TYPE A servo field 200 for seeks and track following with a reduced servo overhead in comparison to TYPE A servo field 200.

TYPE A servo field 200 and TYPE D servo field 230 are distinguished from the other servo fields, described more completely below by full Gray code address sub-field 207. As previously described, a Gray code address is well known to those skilled in the art. TYPE A servo field 200 occurs a limited number of times in the track because field 200 has the maximum overhead (length). In one embodiment, field 200 occurs at least once per track in an embedded servo system requiring AGC sub-field 201 and may occur a multiplicity of times in the track. However, field 200 does not occur in every servo field position in the track.

The second type of servo field, referred to as TYPE B servo field 210 (FIG. 4B) is a modulo servo field, sometimes referred to as a modulo track address servo field. TYPE B servo field 200 is an intermediate size servo field and also includes, in one embodiment, seven sub-fields which are: 1) automatic gain control sub-field 201; 2) start mark sub-field 202; 3) synchronization frame and type sub-field 203; 4) integrity check sub-field 204; 5) sector/index sub-field 205; 6) position sub-field 206; and 7) a modulo Gray code address sub-field 208. In addition to the seven sub-fields 201–206, 208, TYPE B servo field 210 typically includes a write splice sub-field at the start and the end of field 210. The function of each sub-field is described more completely below.

A TYPE E servo field 240 (FIG. 4E) is the same as TYPE B servo field 210 (FIG. 4B), except the TYPE E servo field does not have AGC sub-field 201. Thus, TYPE E servo field 240 provides the same information as a TYPE B servo field 210 for seeks and track following with a reduced servo overhead in comparison to TYPE B servo field 210.

TYPE B servo field 210 and TYPE E servo field 240 contain a reduced address field in comparison to TYPE A servo field 200. Modulo Gray code address sub-field 208 contains an address that is a modulo of a power of two ($2^m$, where m=3, 4, ... ). The maximum practical length for the modulo Gray code track address sub-field is the number of bits in the Gray code full track address sub-field 207 because in this case, TYPE A address sub-field 207 and TYPE B address sub-field 208 are equivalent. If TYPE B servo field 210 provides the only address information for the embedded servo system, the number of bits used in the modulo Gray code address depends on i) the maximum velocity of the actuator during a seek operation and ii) the number of TYPE B servo fields 210 per track, i.e., the distance between TYPE B servo fields 210. The minimum number of TYPE B servo fields 210 in a track, i.e., the maximum time interval between two TYPE B servo fields 210, is selected so that a seek error is not encountered. Specifically, the maximum time interval between two TYPE B servo fields defines the sampling frequency for determining the position of the actuator.

The number of bits used in the modulo Gray code address defines the number of tracks in a modulo band as is known to those skilled in the art. At maximum velocity, the actuator must not travel more than a modulo band, i.e., $2^m$ tracks, during the maximum time interval between two consecutive TYPE B servo fields 210. If the actuator travels more than $2^m$ tracks during the time interval between two consecutive TYPE B servo fields 210, the actuator position, as perceived by the seek monitoring system typically either a microprocessor or a hardware counter, may be in error by $2^m$ tracks, and consequently a seek error occurs.

Typically, the minimum number of TYPE B servo fields 210 is ascertained for a given maximum actuator velocity, spin speed, tracks per inch and a specified number of bits in the modulo Gray code address. Alternatively, the maximum actuator velocity and the distance between TYPE B servo fields 210 may be specified and the number of bits required in the modulo Gray code address determined. In addition, the number of bits in the modulo Gray code address and the distance between TYPE B servo fields 210 may be fixed and the maximum actuator velocity determined. One method for relating these parameters is described more completely below.

As explained more completely below, TYPE B servo fields 210 and TYPE A servo fields 200 are combined in a track so that the servo overhead is reduced in comparison to an embedded servo system that utilizes only TYPE A servo fields 200. The seek performance of an embedded servo system with a combination of TYPE B servo fields 210 and TYPE A servo fields 200 may be slower than an embedded servo system with only TYPE A servo fields, but faster than an embedded servo system with only TYPE B servo fields. In general, interleaving TYPE A and TYPE B servo fields is a tradeoff between the seek sampling rate and the embedded servo overhead. For systems with small disks, e.g., hand held portable computers, somewhat diminished seek performance is acceptable in view of the resulting enhanced data storage capability.

The third type of servo field, referred to as TYPE C servo field 220 (FIG. 4C), is a position only servo field. TYPE C servo field 220 is a small size servo field and includes, in one embodiment, only six sub-fields which are: 1) automatic gain control sub-field 201; 2) start mark sub-field 202; 3) synchronization frame and type sub-field 203; 4) integrity check sub-field 204; 5) sector/index sub-field 205; and 6) position sub-field 206, In addition to the six sub-fields 201–206, TYPE C servo field 220 typically includes a write splice sub-field at the start and the end of field 220. The function of each sub-field is described more completely below.

A TYPE F servo field 250 (FIG. 4F) is the same as TYPE C servo field 220 (FIG. 4C), except the TYPE F servo field does not have AGC sub-field 201. Thus, TYPE F servo field provides the same information as a TYPE C servo field for track following with a reduced servo overhead in comparison to TYPE C servo field 220.

Since TYPE C servo field 220 and TYPE F servo field do not contain any track address information, these fields are useful only for track following and in the final phase of a seek arrival. Hence, TYPE C servo field 220 and TYPE F servo field 250 are used in combination with TYPE A servo fields 200 and/or TYPE B servo fields 210 to further reduce the servo overhead. As described above, the total number of TYPE A and B servo fields per track gives the sampling rate for seeks. The total number of TYPE A, B and C servo fields per track gives the sampling rate for track following. Thus, the use of TYPE C servo fields trades off seek sampling rate for reduced servo overhead while maintaining on track sampling rate and thereby providing better immunity to being pushed off track.

The previous description that referenced only TYPE A, B, and C servo fields is directly applicable to TYPE D, E, and F servo fields respectively. Thus, herein any discussion of using TYPE A, B, and C servo fields is illustrative only of the principles of this invention and is not intended to limit the invention to the particular embodiment described. In view of this disclosure, one skilled in the art will be able to interchange TYPE A, B, and C servo fields with TYPE D, E, and F servo fields respectively.

The absence of AGC sub-field 201 from the D, E, and F type servo fields is possible because the signal amplitude information (AGC level) can be stored in a sample and hold circuit or in a microprocessor memory. For small disks, the magnetic properties of the disk do not vary significantly between the servo fields. Thus, it is unnecessary to update the AGC level at every servo field position. The actual frequency of updating the AGC level depends upon the servo sampling rate (distance between servo field positions), uniformity of the magnetic characteristics of the media and the type of sample and hold technique used.

Specifically, the number of servo fields without AGC sub-fields is increased as the sampling rate increases. The more uniform the magnetic properties (characteristics) of the disk, the less servo fields with AGC sub-fields 201. Also, if the leakage in an analog sample and hold circuit used to store the AGC level is small, fewer servo fields with AGC sub-field 201 are required. Storing the AGC information in a microprocessor in digital form (via an A/D and D/A feedback system) is ideal because such a system has no leakage so that the AGC updating depends only upon the sampling rate and the magnetic properties of the disk.

Since, according to the principles of this invention, two or more servo fields of different length are interleaved on a track, the maximum distance between track address fields, the actuator velocity, and the number of bits in the modulo track address sub-field must be selected so that a seek error does not occur. Specifically, assume that (i) the maximum velocity of the actuator is "x" inches per second; (ii) the number of bits in the modulo track address is "y"; and (iii) the maximum distance between any pair of servo fields containing a track address in the same track is "z" where z is measured in fractions of the full track length. The pair of servo fields separated by distance z must include one servo field that has a modulo track address sub-field.

Herein, the possible pairs of servo fields in a track that both include a track address and at least one of the track addresses is a modulo track address are (i) TYPE A and B servo fields; (ii) TYPE D and B servo fields; (iii) TYPE A and E servo fields; (iv) TYPE D and E servo fields; (V) TYPE B and E servo fields; (vi) TYPE B and B servo fields and (vii) TYPE E and E servo fields. The tracks per inch on the disk is "T" and the spin motor speed is R revolutions per minute (RPM).

With these definitions the maximum distance "D" traveled by the actuator between two consecutive track address samples is:

$$D = x*t \quad (1)$$

Where "t" is the time between two consecutive track address samples at "R" rpm. However, the time for one revolution of the disk is 60 seconds divided by "R" rpm. Thus, $$t = (60/R)*z \quad (2)$$

Substituting the expression for time "t" in the expression for maximum distance "D" gives $$D = (60/R)*x*z \quad (3)$$

The number of tracks N crossed in distance D is the number of tracks per inch T times D or $$N = T*D = (60/R)*x*z*T \quad (4)$$

As explained above, to eliminate the possibility of a seek error the number of tracks N crossed between sampling periods must be less than or equal to $2^y$.

$$N = (60/R)*x*z*T \leq 2^y \quad (5)$$

Expression (5) defines the required relation between variables R, x, z, T and y that must be satisfied to eliminate seek errors. Specifically, $$y \geq \log_2(60*(T/R)*x*z) \quad (6)$$

$$z \leq (1/60)*(R/T)*(1/x)*2^y$$

$$x \leq (1/60)*(R/T)*(1/z)*2^y$$

For example, for:

| | |
|---|---|
| modulo 32 track address | $y = 5$ |
| 3600 rpm spin motor speed | $R = 3600$ |
| maximum actuator velocity 20 ips | $x = 20$ |
| 1500 tracks per inch | $T = 1500$ |
| $z \leq (1/60)*(3600/1500)*(1/20)*2^5$ | |
| $z \sim 1/16$ of a track. | |

Figure 5A:
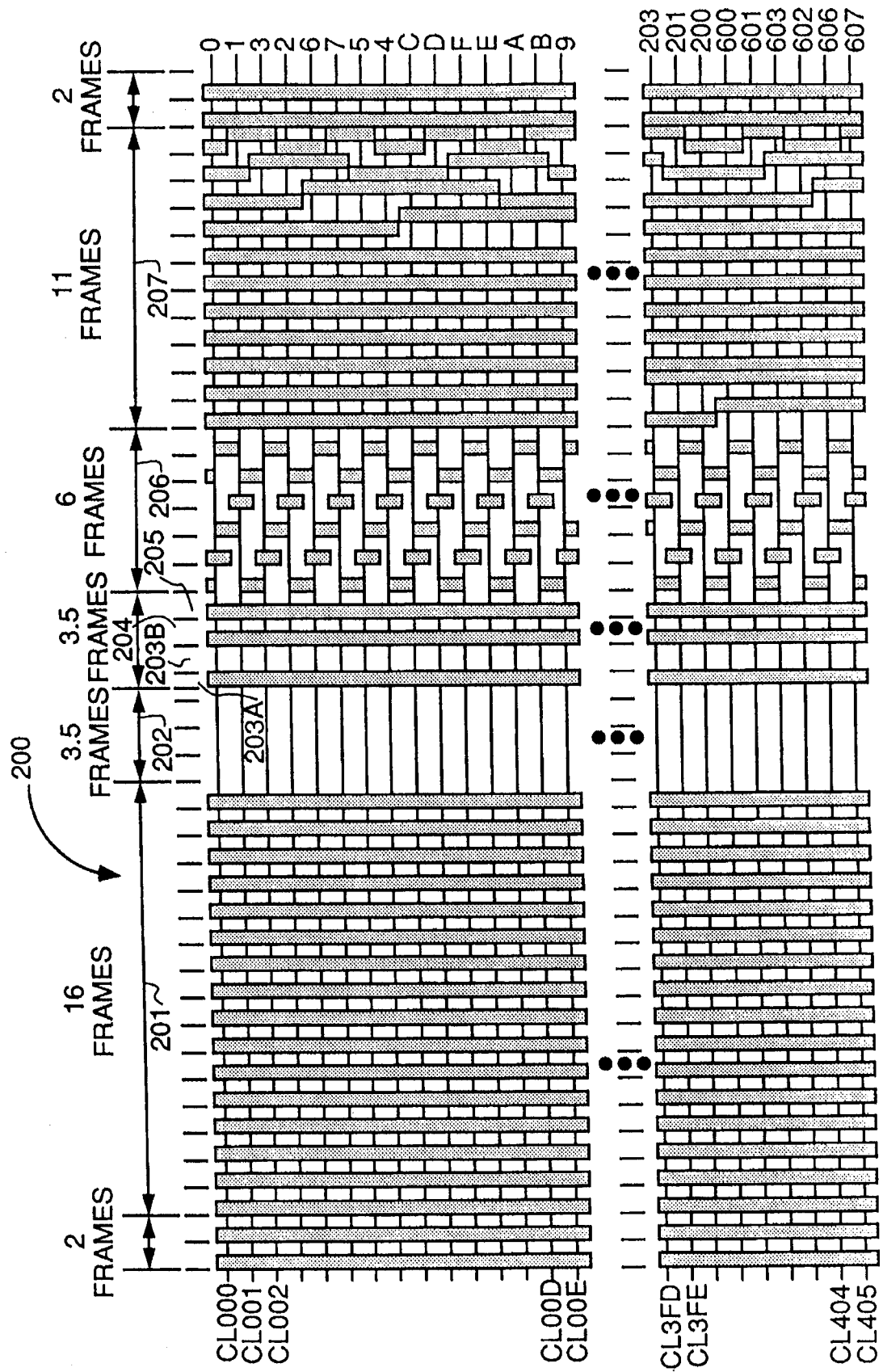
FIG. 5A illustrates one embodiment of a magnetization pattern for a full address servo field with an automatic gain control sub-field according to the principles of this invention.
Figure 5C:
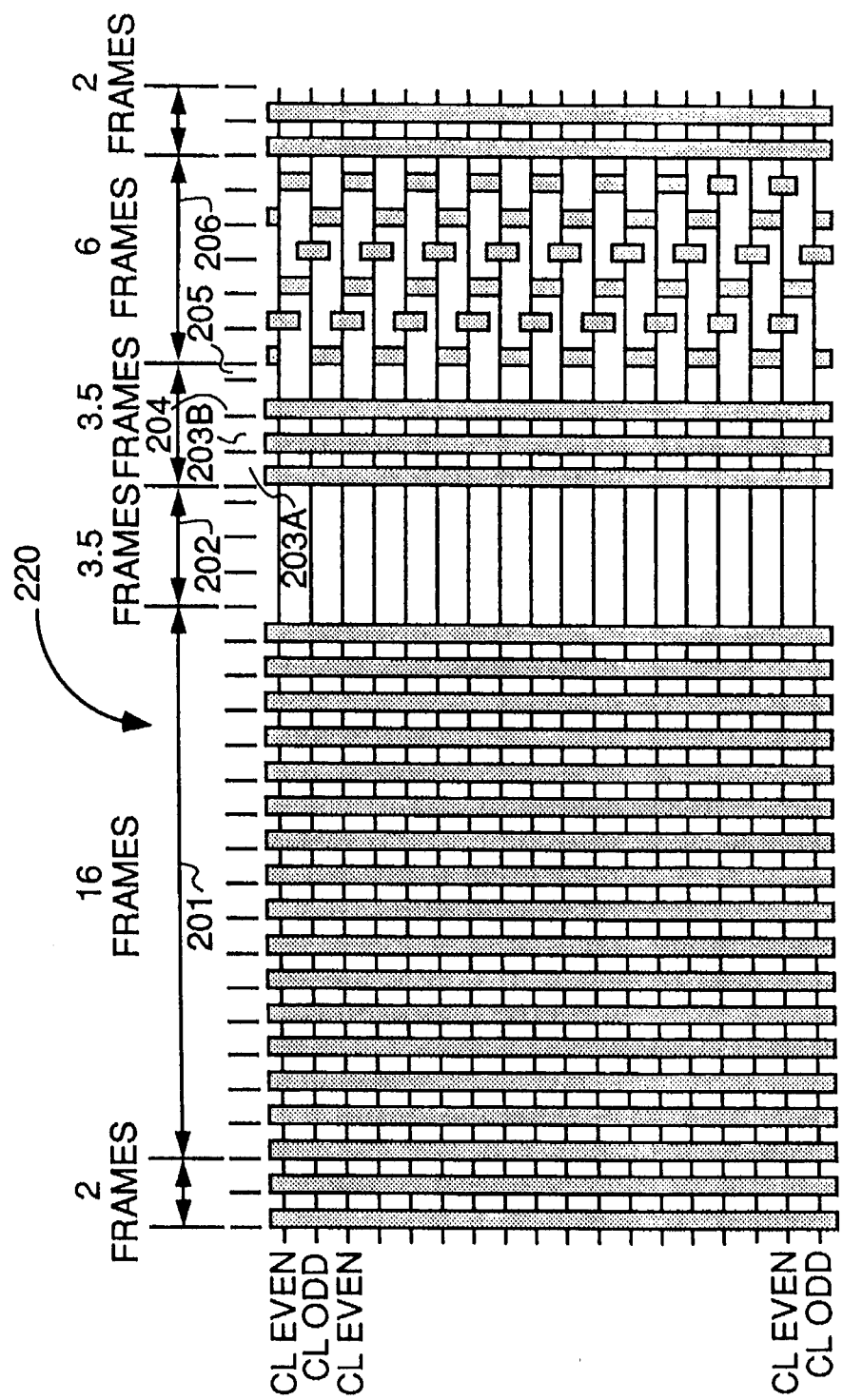
FIG. 5C illustrates one embodiment of a magnetization pattern for a position only servo field with an automatic gain control sub-field according to the principles of this invention.

Typical magnetization patterns for TYPE A, B, and C servo fields 200, 210, and 220 for an arbitrary sector in adjacent tracks are illustrated in FIGS. 5A–5C. In FIGS. 5A–5C, a shaded area represents one polarity of magnetization of the disk. The unshaded portions represent the opposite polarity. Horizontal lines CL000 to CL405 (FIG. 5A) represent the center lines of tracks having TYPE A servo field 200. Horizontal lines CL32+00 to CL32+02 (FIG. 5B) represent the center lines of the tracks having TYPE B servo field 210. A similar nomenclature is used in FIG. 5C for tracks having TYPE C servo fields 220. In FIGS. 5A and 5B, the number on the track centerline on the right hand side of the figure is the Gray scale code track address in hexadecimal. While in FIGS. 5A–5C servo field types of the same type are shown in adjacent tracks, this representation is for ease of illustration only and is not intended to limit the invention to an embedded servo system where for a given sector, say sector s, sector s in each track has the same servo field type. Typical magnetization patterns for TYPE D, E, and F servo fields 230, 240, and 250 for an arbitrary sector in adjacent tracks are identical to those illustrated in FIGS. 5A–5C respectively, except the sixteen frames of AGC sub-field 201 are eliminated. A summary of the length for the six servo fields of this invention, as illustrated in FIGS. 5A–5C, is given in Table 1.

TABLE 1

SERVO FIELD LENGTHS FOR ONE EMBODIMENT OF THIS INVENTION

| Sub-Field | TYPE A | TYPE B | TYPE C | TYPE D | TYPE E | TYPE F |
|---|---|---|---|---|---|---|
| Write Splice | 2 | 2 | 2 | 2 | 2 | 2 |
| AGC 201 | 16 | 16 | 16 | — | — | — |
| Mark 202 | 4 | 4 | 4 | 4 | 4 | 4 |
| Synch 203A | 1 | 1 | 1 | 1 | 1 | 1 |
| Type 203B | 1 | 1 | 1 | 1 | 1 | 1 |
| Integrity 204 | 1 | 1 | 1 | 1 | 1 | 1 |
| S/I 205 | 1 | 1 | 1 | 1 | 1 | 1 |
| Position 206 | 6 | 6 | 6 | 6 | 6 | 6 |
| Full Address 207 | 11 | — | — | 11 | — | — |
| Modulo Address 208 | — | 5 | — | — | 5 | — |
| Write Splice | 2 | 2 | 2 | 2 | 2 | 2 |
| TOTAL | | | | | | |
| (Frames) | 45 | 39 | 34 | 29 | 23 | 18 |
| (Bits) | 360 | 312 | 272 | 232 | 184 | 144 |

In Table 1, partial frames have been rounded up to full frames. Further, each frame for this example is one byte in length and a byte is eight bits. Also, the sizes given in TABLE 1 are only illustrative of the principles of this invention and are not intended to limit the invention to the particular embodiment described. In view of this invention, those skilled in the art will be able to implement various sized servo fields. The important aspect is to interleave the different length servo fields so that the servo overhead is reduced but the sampling is sufficient to give the desired seek and track following performance.

Figure 6A:
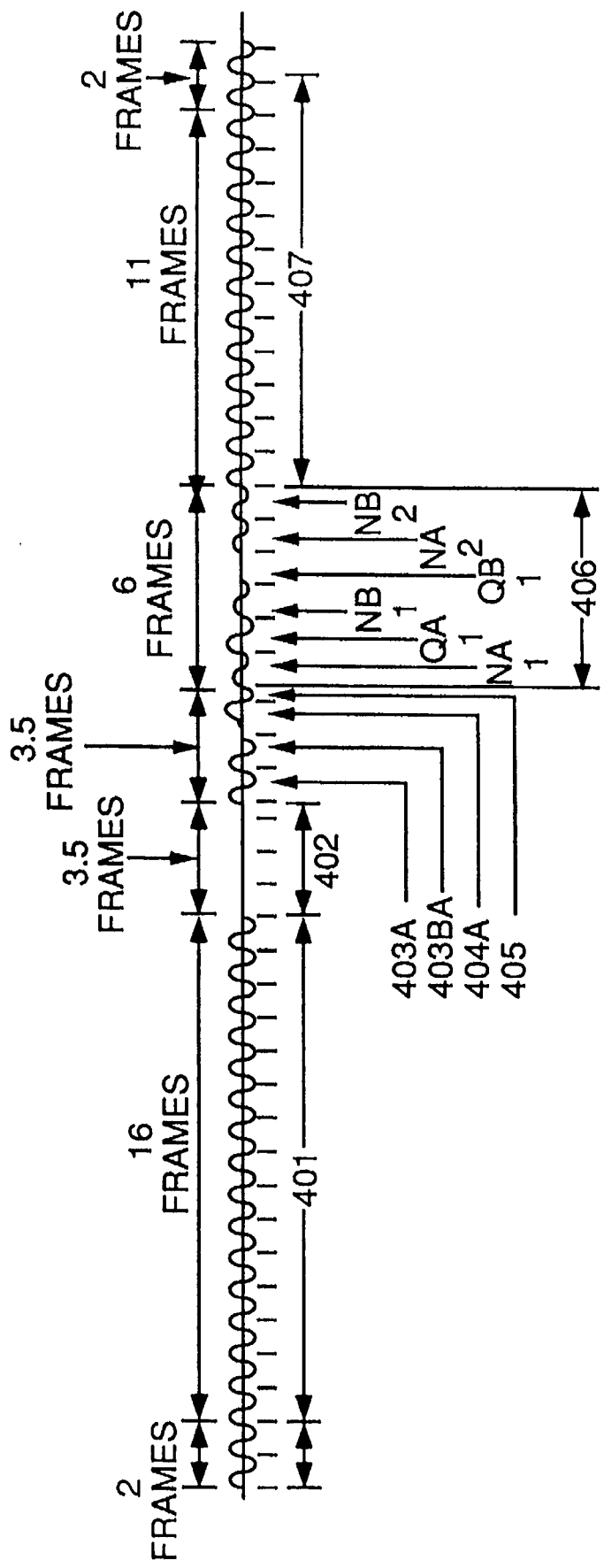
FIG. 6A illustrates one embodiment of a signal trace generated when the head is positioned over the track centerline by a full address servo field with an automatic gain control sub-field according to the principles of this invention.
Figure 6B:
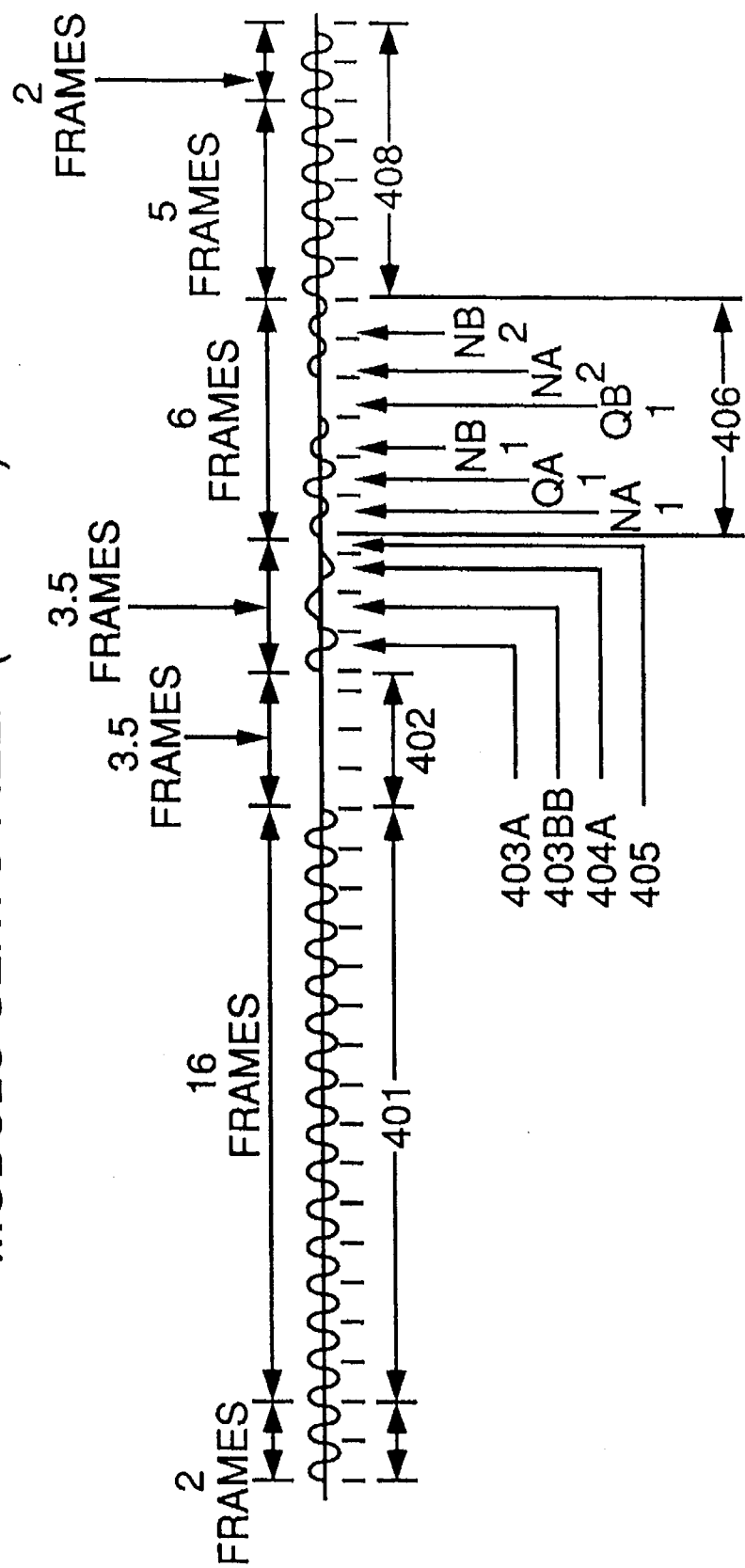
FIG. 6B illustrates one embodiment of a signal trace generated when the head is positioned over the track centerline by a modulo address servo field with an automatic gain control sub-field according to the principles of this invention.
Figure 6C:
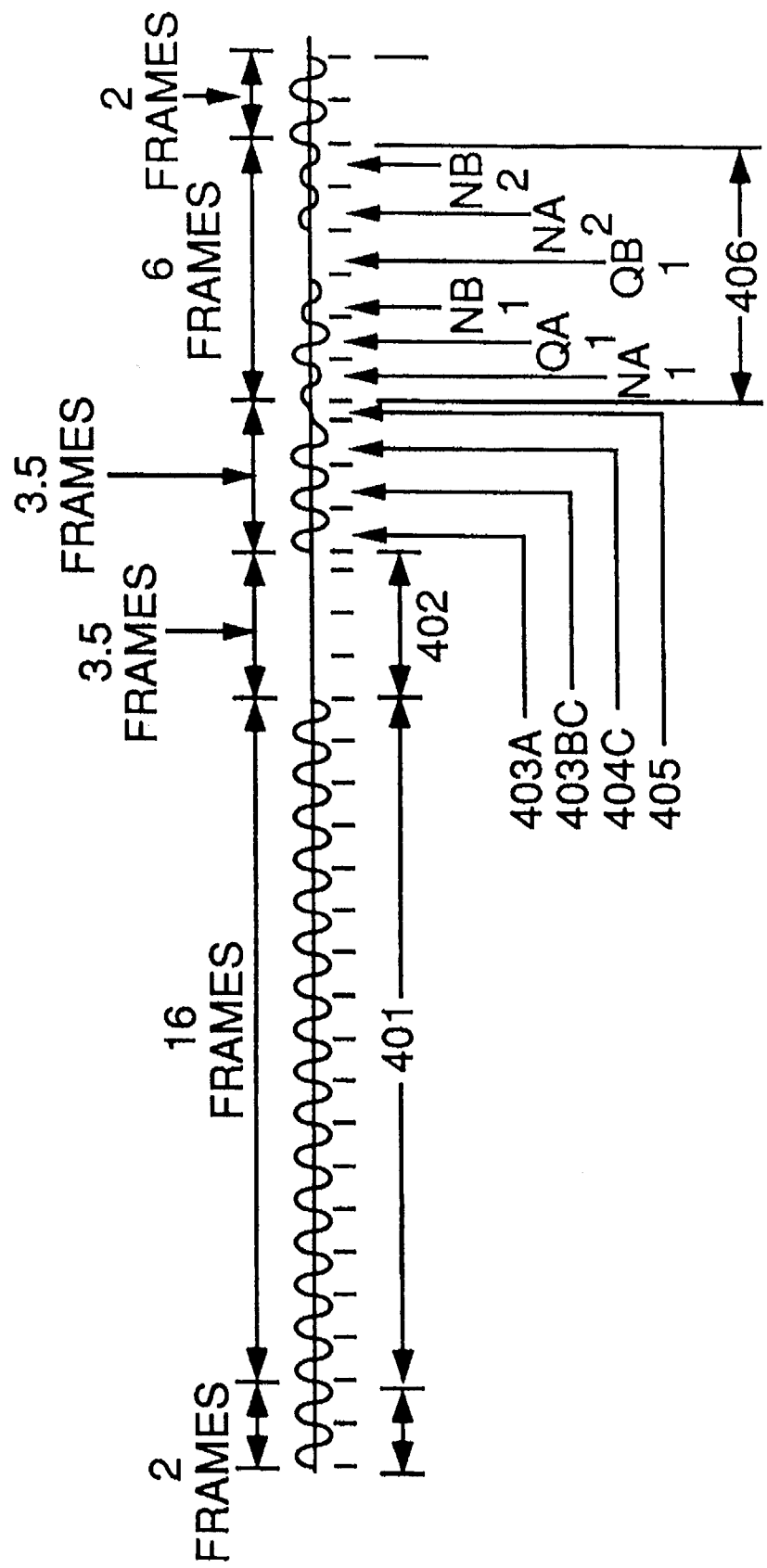
FIG. 6C illustrates one embodiment of a signal trace generated when the head is positioned over the track centerline by a position only servo field with an automatic gain control sub-field according to the principles of this invention.

AGC sub-field 201, which is contained in TYPE A, B, and C servo fields, is, in this embodiment(FIG. 5A–5C), sixteen frames in length. As used herein, a frame is one byte which is eight bits. FIGS. 6A–6C illustrate waveform 401 generated by the magnetic pattern in AGC sub-field 201 as illustrated in FIGS. 5A–5C respectively. The function of the AGC sub-field 201 is the same as in the prior art embedded servo systems, i.e., the automatic gain control sub-field signal is used to normalize the signals from the read/write head so that subsequent servo sub-fields are properly detected and processed.

Start mark sub-field 202 is a fully DC erased gap that is 3.5 frames in length in one embodiment. FIGS. 6A–6C illustrate waveform 402 generated by the magnetic pattern in start mark sub-field 202 as illustrated in FIG. 5A–5C respectively. Start mark sub-field 202 is used to provide a readily identifiable region prior to initiation of synchronization.

Synchronization and type sub-field 203, integrity check sub-field 204 and sector/index sub-field 205, in this embodiment, are 3.5 frames in length. Waveform 403A (FIGS. 6A–6C) generated by synchronization frame 203A (FIGS. 5A–5C) is used to generate a synchronization pulse that is used in timing the reading of the remaining embedded servo data.

Type frame 203B and integrity check frame 204 identify the type of embedded servo field and are used to ascertain whether a read error occurred. The sector/index sub-field 205 is used to generate an index pulse once per revolution to identify the first sector in the track and a sector pulse for all other sectors in the track.

Figure 7A:
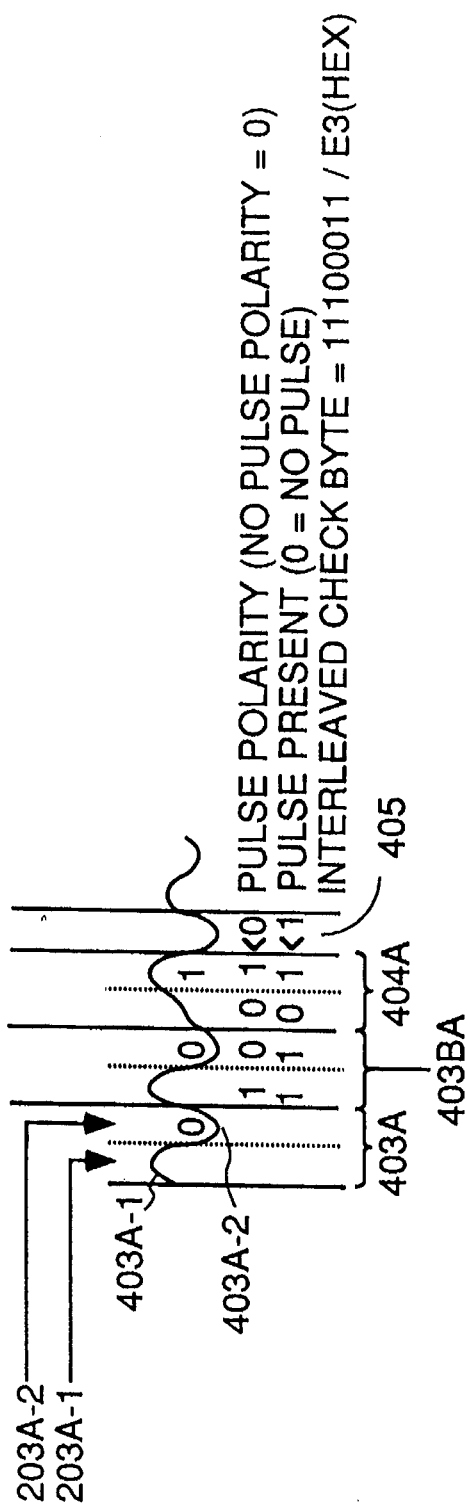
FIG. 7A illustrates one embodiment of a signal trace generated by the synchronization, type and integrity sub-fields of a full address servo field and the resulting pulse polarity and pulse present signals according to the principles of this invention.
Figure 7B:
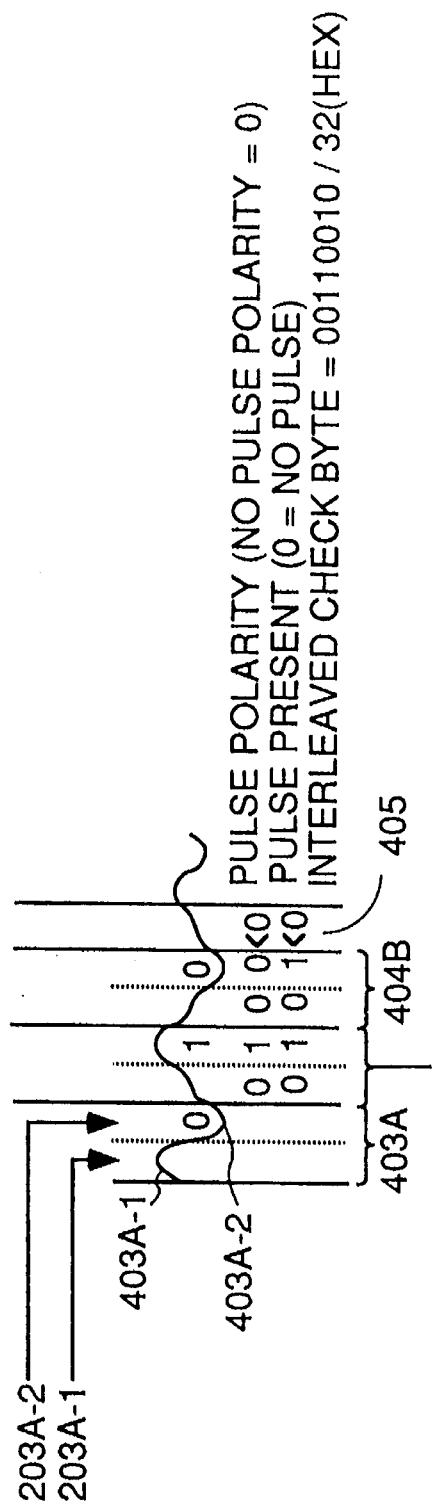
FIG. 7B illustrates one embodiment of a signal trace generated by the synchronization, type and integrity sub-fields of a modulo address servo field and the resulting pulse polarity and pulse present signals according to the principles of this invention.
Figure 7C:
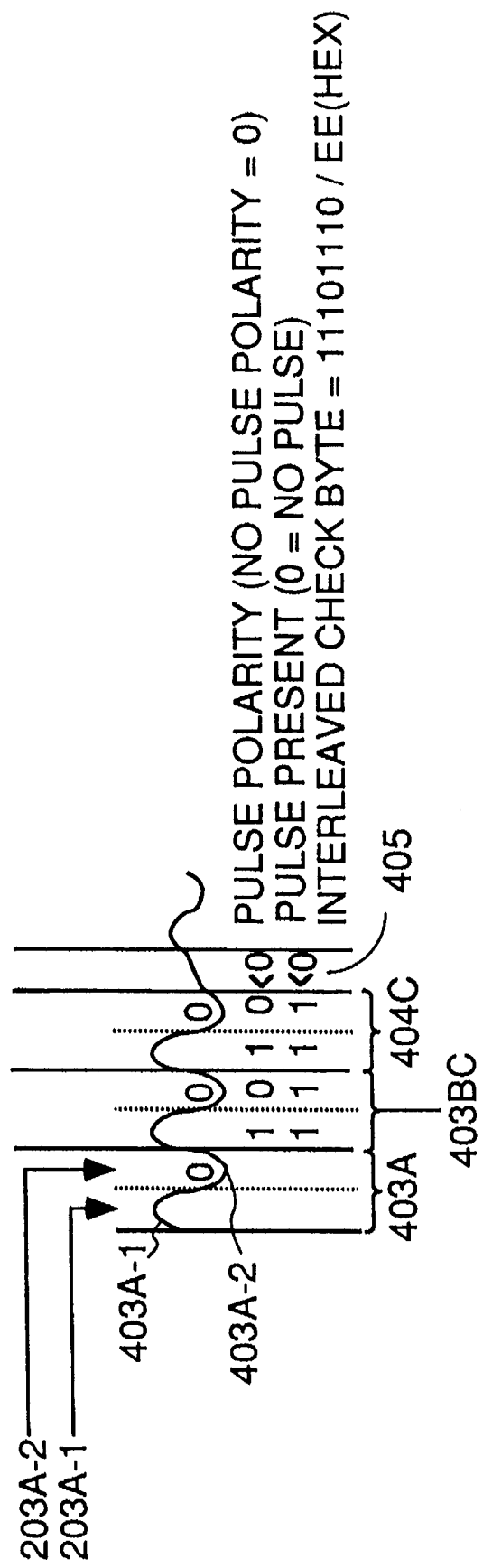
FIG. 7C illustrates one embodiment of a signal trace generated by the synchronization, type and integrity sub-fields of a position only servo field and the resulting pulse polarity and pulse present signals according to the principles of this invention.

Synchronization 203A is a frame that includes a phase transition 203A-1 and a data transition 203A-2 (FIGS. 7A–7C). Thus, when the electronic circuitry senses the synchronization phase transition wave form 403A-1 and data transition waveform 403A-2, a synchronization pulse is generated.

Type sub-field 203B and integrity check sub-field 204 are also each one frame long. The signals generated by these two sub-fields are used to generate a data byte, as described below, that is checked to assure that a read error has not occurred. In another embodiment, only integrity sub-field 204 is used and type sub-field 203B is eliminated.

FIG. 7A illustrates in more detail the signals generated by synchronization sub-field 203A, type sub-field 203B, integrity check sub-field 204 and sector/index sub-field 205 for TYPE A servo field 200 as illustrated in FIG. 6A. The equivalent signals for synchronization sub-field 203A, type sub-field 203B, integrity check sub-field 204 and sector/index sub-field 205 for TYPE B servo field 210 and TYPE C servo field 220 are illustrated in FIGS. 7B and 7C respectively. Also, while fields 200, 210, and 220 are described herein, FIG. 7A also illustrates the signals for synchronization sub-field 203A, type sub-field 203B, integrity check sub-field 204 and sector/index sub-field 205 for TYPE D servo field 230. FIG. 7B also illustrates the same signals for TYPE E servo field 240 and FIG. 7C the same signals for TYPE F servo field 250.

Frame 203A (FIGS. 5A–5C) is the synchronization frame and is used to generate signal 403A (FIG. 7A–7C) which in turn is processed by the disk drive electronics to generate a synchronization pulse. In interpreting signals from type frame 203B and integrity check frame 204 (FIGS. 5A–5C), two checks are made by the disk drive electronics, i.e., whether a pulse is present and the polarity of the pulse. In this embodiment, a logical zero means that no pulse is present and if a pulse is not present, the pulse polarity is-assigned by convention a logical zero value. In FIGS. 7A–7C, the first row of numbers under the signal trace are the pulse polarity signals and the second row of numbers are the pulse present signals.

Specifically, for TYPE A servo field 200 signal (FIG. 7A), type frame 203B (FIG. 5A) generates a positive and a negative pulse 403BA. Integrity check frame 204 (FIG. 5A) generates no pulse followed by a positive pulse 404A (FIG. 7A). Hence, Table 2 shows the signals generated for pulse polarity and pulse present by the disk drive electronics. (The values in Table 2 are the same as those shown in FIG. 7A. Also, since as explained above, TYPE A and TYPE D servo fields have identical type and integrity frames, the TYPE D servo field is included in TABLE 2.)

TABLE 2

TYPE A AND TYPE D SERVO FIELD
CHECK BYTE GENERATION

| Pulse Polarity | 1 | 0 | 0 | 1 |
| Pulse Present | 1 | 1 | 0 | 1 |
| Interleaved Check Byte = 11100011 (E3h) | | | | |

The results of the signals from type frame 203B and integrity frame 204 (FIG. 5A) are used to form the interleaved check byte. The interleaved check byte is compared with values stored in a read-only memory (ROM) in the disk drive to determine the type of servo field. If the interleaved check byte is not the same as the check byte stored in ROM for that particular servo field, an error has occurred.

For TYPE B servo field 210 signal (FIG. 7B), type frame 203B (FIG. 5B) generates no pulse and a positive pulse 403BB. Integrity check frame 204 (FIG. 5B) generates no pulse followed by a negative pulse 404B (FIG. 7B). Hence, Table 3 shows the signals generated for pulse polarity and pulse present by the disk drive electronics. (The values in Table 3 are the same as those shown in FIG. 7B. Also, since as explained above, TYPE B and TYPE E servo fields have identical type and integrity frames, the TYPE E servo field is included in TABLE 3.)

TABLE 3

TYPE B AND TYPE E SERVO FIELD
CHECK BYTE GENERATION

| Pulse Polarity | 0 | 1 | 0 | 0 |
| Pulse Present | 0 | 1 | 0 | 1 |
| Interleaved Check Byte = 00110010 (32h) | | | | |

Again, the results of the signals from type frame 203B and integrity frame 204 (FIG. 5B) are used to form the interleaved check byte for TYPE B servo field 210. The interleaved check byte is compared with values stored in a read-only memory(ROM) in the disk drive to determine the type of servo field. If the interleaved check byte is not the same as the check byte stored in ROM for that particular servo field, an error has occurred.

For TYPE C servo field 220 signal (FIG. 7C), type frame 203B (FIG. 5C) generates a positive pulse followed by a negative pulse 403BC. Integrity check frame 204 (FIG. 5C) also generates a positive pulse followed by a negative pulse 404C (FIG. 7C). Hence, Table 4 shows the signals generated for pulse polarity and pulse present by the disk drive electronics. (The values in Table 4 are the same as those shown in FIG. 7C Also, since as explained above, TYPE C and TYPE F servo fields have identical type and integrity frames, the TYPE F servo field is included in TABLE 4.)

TABLE 4

TYPE C AND TYPE F SERVO FIELD
CHECK BYTE GENERATION

| Pulse Polarity | 1 | 0 | 1 | 0 |
| Pulse Present | 1 | 1 | 1 | 1 |
| Interleaved Check Byte = 11101110 (EEh) | | | | |

As for the TYPE A and B servo fields, the results of the signals from type frame 203B and integrity frame 204 (FIG. 5C) are used to form the interleaved check byte for TYPE C servo field 220. The interleaved check byte is compared with values stored in a read-only memory (ROM) in the disk drive to determine the type of servo field. If the interleaved check byte is not the same as the check byte stored in ROM for that particular servo field, an error has occurred.

Position sub-field 206, as illustrated in FIGS. 5A–5C for TYPE A, B and C servo fields respectively, is another novel feature of this invention. In one embodiment, position sub-field 206 includes an equal number of normal and quadrature servo frame pairs with the frame pairs interleaved. When the number of normal and quadrature servo frame pairs are the same, the position sub-field is described as being a symmetrical structure.

Herein, a normal frame refers to a frame that is recorded in half-track positions and a pair of normal frames include one frame with the region above the center line of the track recorded and another frame with the region below the center line of the track recorded. The two frames in a normal pair of frames need not be directly adjacent to each other. For example, a quadrature frame may be interposed between the two frames that constitute the pair of normal frames. To assure that the difference of the readback signals gives position information relative to the track centerline, the normal frames change polarity in adjacent tracks.

A quadrature frame is a frame in which the information is recorded in the on-track position and is either present or missing, in this embodiment. A pair of quadrature frames include one frame with the on-track position magnetized and another frame with the on-track position unmagnetized. The two frames in a quadrature pair of frames are preferably separated by a normal frame. Also, the quadrature servo frame polarity is opposite in adjacent tracks.

Figure 8A:
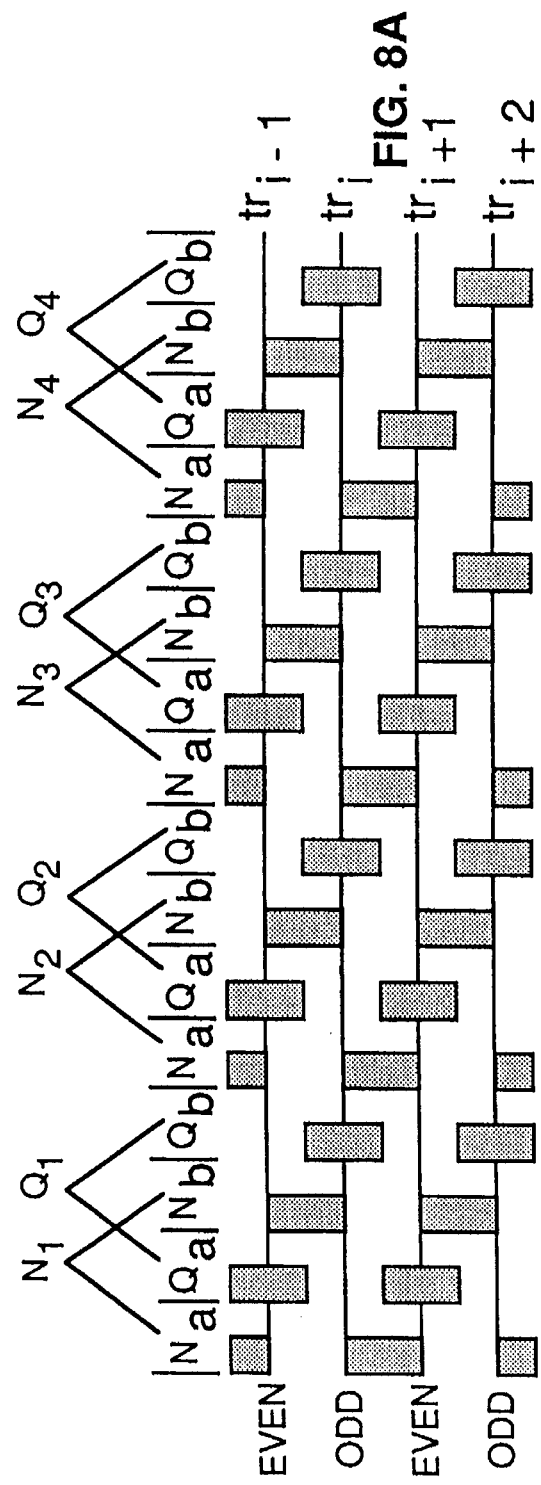
FIG. 8A illustrates a sixteen frame symmetrical magnetization pattern for the position sub-field of this invention.

FIG. 8A illustrates one embodiment of position sub-field 206 that consists of an equal number of normal and quadrature servo frame pairs. A first normal frame Na is followed by a first quadrature frame Qa. Quadrature frame Qa is followed by a second normal frame Nb which is turn is followed by a second quadrature frame Qb. The four frames Na, Qa, Nb, Qb form a cell that is repeated three more times to form a four cell position sub-field with a total of sixteen frames. The sixteen frames include four pairs of normal frames N1, N2, N3, N4 and four pairs of quadrature frames Q1, Q2, Q3, Q4.

In FIG. 8A, the center lines of four tracks $tr_{i-}$, $tr_i$, $tr_{i+1}$ and $tr_{i+2}$ and the magnetization patterns for each track are shown. Tracks $tr_{i-1}$, and $tr_{i+1}$ are referred to as "even tracks" and the other tracks are referred to as "odd tracks." This embodiment provides highly accurate track following and is used when the 16 frames of overhead is acceptable. However, for small disks, this overhead is usually not acceptable. Therefore, an asymmetrical structure is utilized in position sub-field 206. In an asymmetrical structure, the number of pairs of normal frames is different from the number of pairs of quadrature frames.

Figure 8B:
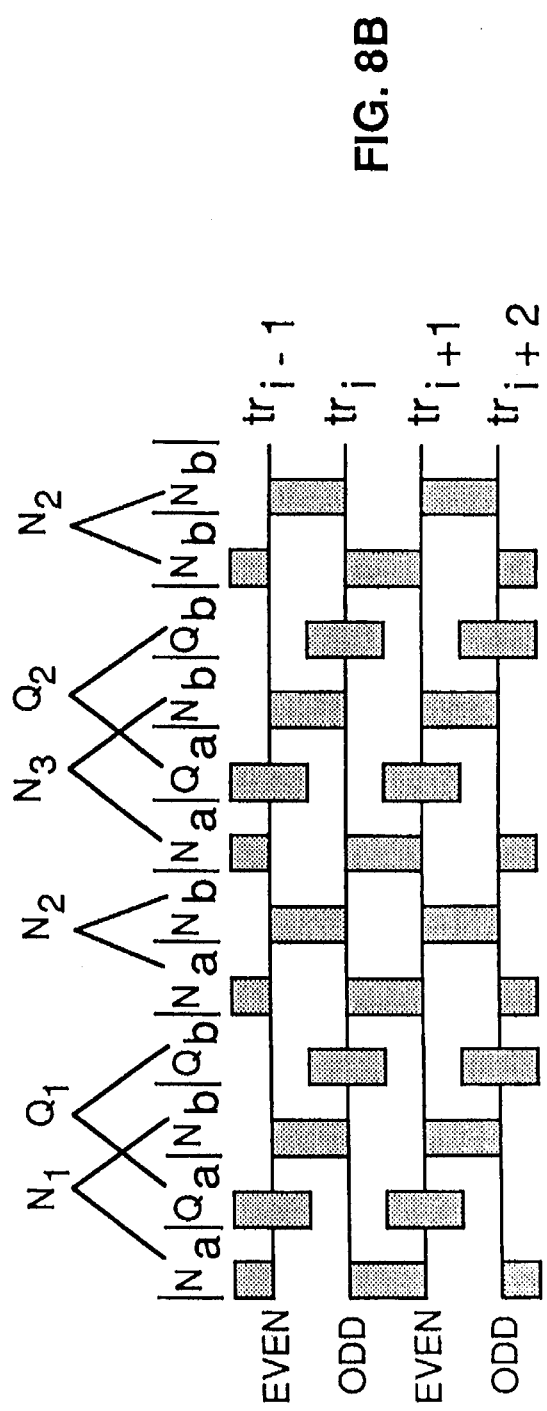
FIG. 8B illustrates a twelve frame asymmetrical magnetization pattern for the position sub-field of this invention.

FIG. 8B illustrates a first embodiment of an asymmetrical position sub-field for tracks $tr_{i-1}$, $tr_i$, $tr_{i+1}$ and $tr_{i+2}$ and the magnetization patterns for each track. In this embodiment two of the cells in FIG. 8A, i.e., are separated by a cell having only a pair of normal frames. Thus, position sub-field 206 has frames Na, Qa, Nb, Qb, Na, Nb, Na, Qa, Nb, Qb, Na, and Nb for a total of four normal frame pairs N1, N2, N3, and N4 and only two quadrature frame pairs Q1 and Q2. This asymmetrical position sub-field reduces the overhead to 12 frames.

The position sub-field illustrated in FIG. 8B is typically used in disk drives with (i) relatively large disk diameter, e.g., disks with a diameter of about 3.5 inches or greater, (ii) medium magnetic property variation along the track, e.g., oxide coated media or low density plated media with densities smaller than 25 Megabits per square inch, and (iii) moderate defect population and size, e.g., about 2 or 3 defects per Megabyte of data. In this embodiment, the effect of magnetic properties variation and defect population and size is minimized by the repeating the basic cell structure, i.e, frames Na, Qa, Nb, Qb, Na, Nb, so there is a spread between the position frames. This separation effectively results in an averaging of the effect of magnetic properties variation and defect population and size which in turn minimizes any such effect in the same manner as the symmetrical position sub-field.

Figure 8C:
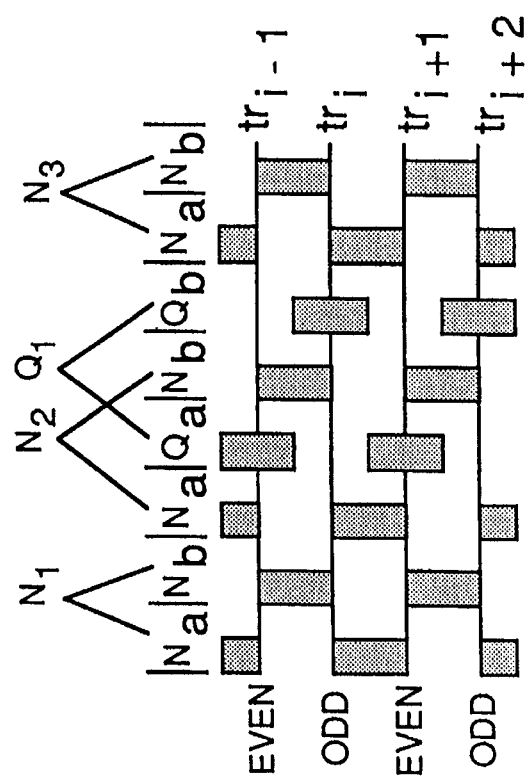
FIG. 8C illustrates an eight frame asymmetrical magnetization pattern for the position sub-field of this invention.

FIG. 8C illustrates a second embodiment of an asymmetrical position sub-field for tracks $tr_{i-1}$, $tr_i$, $tr_{i+1}$ and $tr_{i+2}$ and the magnetization patterns for each track. In this embodiment one of the cells in FIG. 8A are surrounded by a pair of normal frames. Thus, position sub-field 206 has frames Na, Nb, Na, Qa, Nb, Qb, Na, and Nb for a total of three normal frame pairs N1, N2, and N3 and only one quadrature frame pair Q1. This asymmetrical position sub-field reduces the overhead to 8 frames or one half the overhead of symmetrical position sub-field 206 (FIG. 8A).

The position sub-field illustrated in FIG. 8C is typically used in disk drives with (i) relatively small disk diameter, e.g., disks with a diameter in the range of about 2.5" to about 3.5", or (ii) high magnetic density e.g., about 25 to about 50 Megabits per square inch, and (iii) high quality disk surfaces, e.g., about one defect per one Megabyte of data. In this embodiment, the accuracy of the quadrature position signal is not critical to the performance of the disk drive.

Figure 8D:
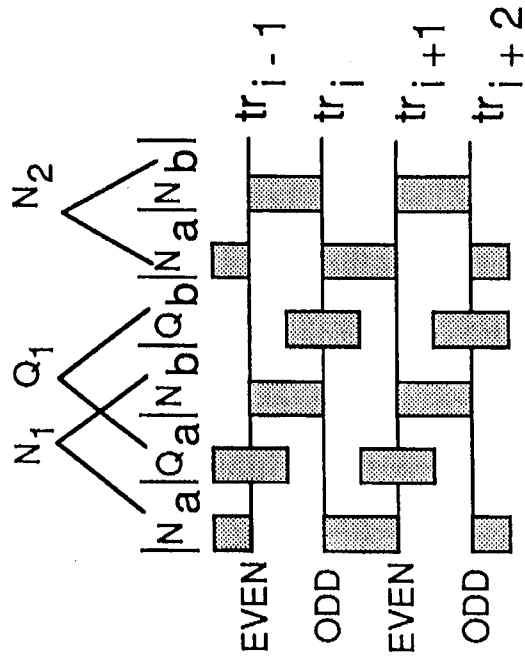
FIG. 8D illustrates a six frame asymmetrical magnetization pattern for the position sub-field of this invention.

An alternative to the asymmetrical position sub-field of FIG. 8B is to use only one half the frames as illustrated in FIG. 8D. In this embodiment as illustrated in FIGS. 5A–5C and 6A–6C, the position sub-field 206 has frames Na, Qa, Nb, Qb, Na, and Nb for a total of two normal frame pairs N1 and N2 and only one quadrature frame pair Q1. This asymmetrical position sub-field reduces the overhead to 6 frames. This position sub-field is typically used in disk drives having a small diameter disk, e.g., about a 1.8 inch diameter with high surface quality, e.g., greater than 50 Megabits per square inch.

Figure 9:
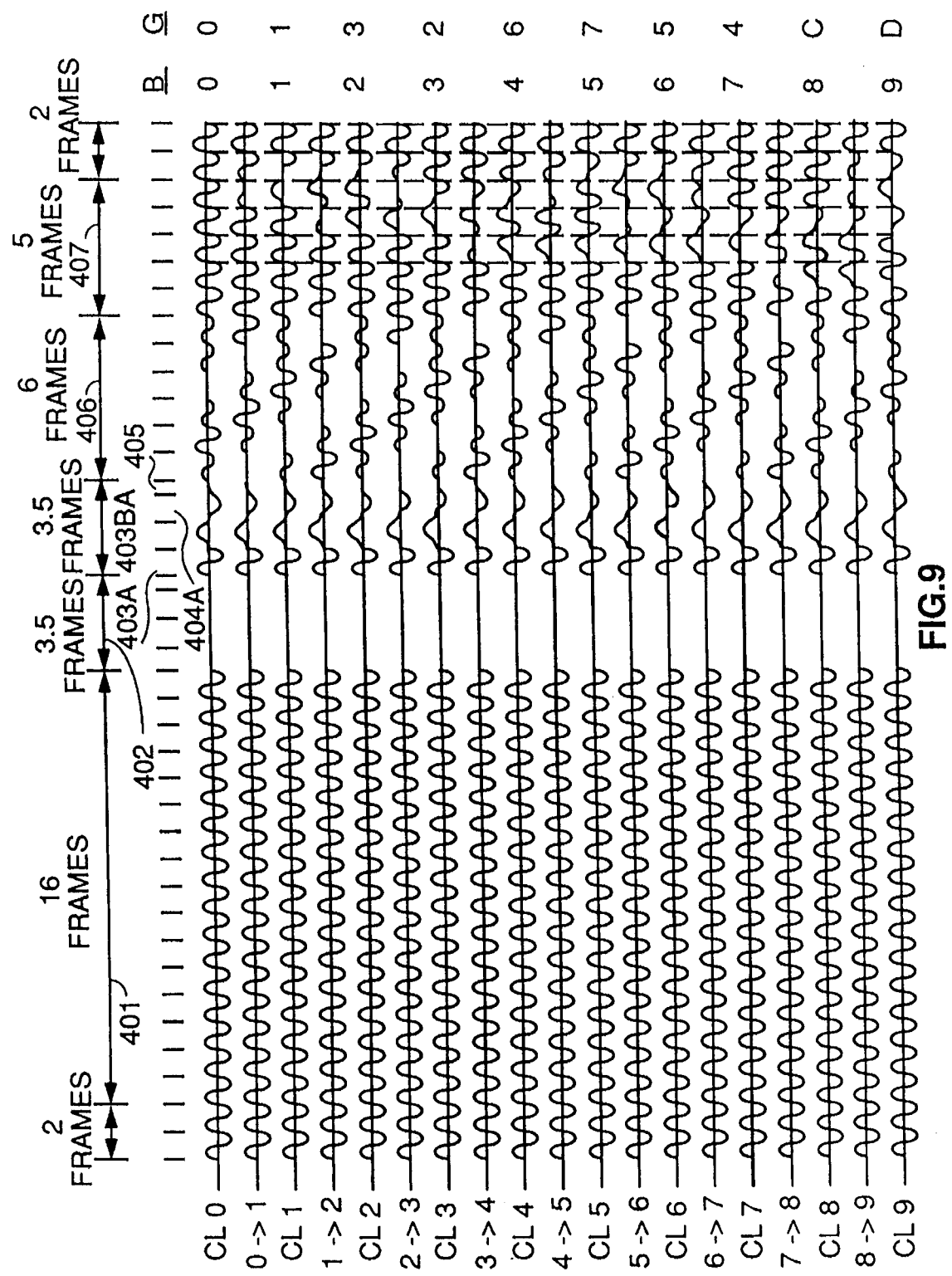
FIG. 9 illustrates the signal traces generated for a plurality of modulo address servo fields of this invention and in particular the Gray code signal traces as the read/write head moves radially across the disk during a seek.

Modulo address sub-field 208 and full address sub-field 207 are both implemented using Gray code. In one embodiment full address sub-field 207 (FIG. 5A) is eleven frames in length and modulo address sub-field 208 (FIG. 5B) is five frames in length. An example of the signals generated by the Gray code modulo address sub-field is given in FIG. 9. Specifically, the signals generated when the read/write head follows the track centerline and the signals generated when the read/write head is positioned halfway between adjacent track centerline are alternately illustrated.

As described above, using only TYPE A servo fields provides high seek performance along with a high servo overhead. Using only TYPE B servo fields 210, while reducing the servo overhead, limits the seek performance of the disk drive by imposing a limit on the maximum actuator velocity so that seek errors do not occur. Therefore, only TYPE B servo fields 210 are typically used in disk drives where seek performance is not a critical factor.

According to the principles of this invention, as described above, different types of servo fields are interleaved within a track. For those situations where higher performance is desired along with improved servo overhead over the prior art servo systems, a combination of TYPE A servo fields 200 and TYPE B servo fields 210 are used. Alternatively, where seek performance is not of importance, a combination of TYPE B servo fields 210 and TYPE C servo fields 220 are used.

The combination of TYPE A servo fields 200 and TYPE B servo fields 210 within each track of the disk permits higher actuator velocities than is possible using only TYPE B servo fields 210. In addition, a smaller modulo address sub-field may be used with the combination of TYPE A servo fields 200 and TYPE B servo fields 210 than the modulo address sub-field when TYPE B servo fields are used exclusively.

As is known to those skilled in the art, the actuator may move through three velocity ranges during a seek. Initially, the actuator is at rest with the read/write head at a known position over the disk. When the actuator is energized, the actuator goes through an acceleration until the maximum velocity is reached. Upon attaining the maximum velocity, the actuator continues at the maximum velocity until the distance to the target track is such that applying the worst case maximum braking capabilities, the actuator stops the read/write head before the head passes the target track. The actuator then decelerates to a zero velocity as determined by deceleration constant $K_d$. If the new position is close to the initial position of the actuator, the actuator may never reach the maximum velocity so that only the acceleration and deceleration stages occur.

Figure 10:
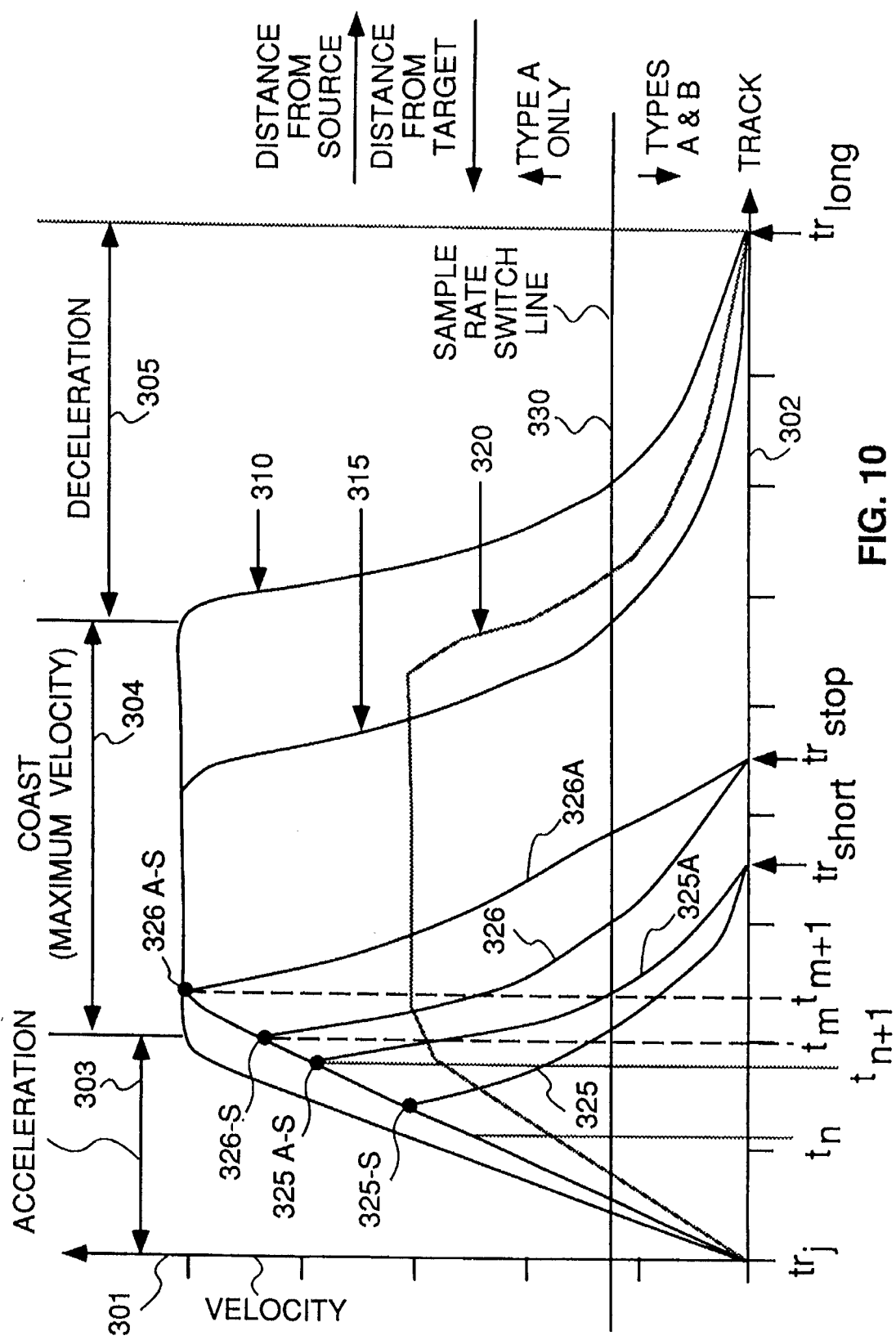
FIG. 10 illustrates the enhanced seek performance achieved using interleaved full address and modulo address servo fields according to the principles of this invention.

The effect on seek performance of an embedded servo system using (i) only TYPE A servo field 200, (ii) only TYPE B servo fields 210 and (iii) a combination of TYPE A servo fields 200 and TYPE B servo fields 210 is illustrated in FIG. 10. Vertical axis 301 represents the velocity of the actuator in arbitrary units and horizontal axis 302 represents track location on the disk.

In each case, there are 60 servo fields per track. The servo field for the disk having TYPE A servo fields only includes an eleven bit Gray code full track address. The servo field for the disk having TYPE B servo fields only includes a four bit Gray code modulo track address. The disk with mixed servo fields has 30 TYPE A servo fields and 30 TYPE B servo fields where the TYPE A servo fields has an 11 bit Gray code full track address and the TYPE B servo fields has a 3 bit Gray code modulo track address. Hence, the TYPE B servo field track address was smaller in the mixed field servo system than in the TYPE B only servo field system.

Initially, the actuator is positioned so that the read/write head is over track $tr_j$ (FIG. 10). Curve 310 illustrates the desired high performance seek profile for an embedded servo system using only TYPE A servo fields 200 for a long seek from track $tr_j$ to track $tr_{long}$. For this case, the maximum actuator velocity is not limited by the track address in the servo field but rather by the mechanical structure, deceleration constant $K_d$, and the voltage available to drive the actuator coil.

Curve 315 illustrates the desired medium performance seek profile for an embedded servo system using both TYPE A servo fields 200 and TYPE B servo fields 210 for the same long seek from track $tr_j$ to track $tr_{long}$. Curve 320 illustrates the desired low performance seek profile for an embedded servo system using only TYPE B servo fields 210 for the same long seek where modulo address sub-field 208 is 4 bits in length. Herein, a long seek is defined as any seek where the actuator reaches the constant velocity region. Conversely, a short seek is a seek where the actuator fails to reach the constant velocity region.

Curve 310 illustrates the three velocity regions described above, an acceleration region 303, a maximum velocity region 304 sometimes called a coast region, and a deceleration region 305. Curves 315 and 320 similarly have the three velocity regimes. In general, the steeper the acceleration and deceleration ramps, the better the seek performance because the actuator spends a longer time in the maximum velocity region. Also, the higher the maximum actuator velocity, the better the seek performance.

In an embedded servo system with a combination of TYPE A servo fields 200 and TYPE B servo fields 210, e.g. curve 315, only TYPE A servo fields 200 are sampled to determine the position of the actuator when the actuator achieves a predetermined velocity. In FIG. 10, this predetermined velocity is represented by line 330. The predetermined velocity is determined by the combination of the actuator velocity and the number of bits used for the Gray code in modulo address sub-field 208. As explained above, the greater the number of bits in modulo address sub-field 208, the greater the velocity at which TYPE B servo fields may be sampled without error. Similarly, for combined TYPE A and TYPE B servo fields, the greater the number of bits in modulo address sub-field 208, the greater the velocity at which TYPE A and TYPE B servo fields may be sampled without error. As noted above, the modulo address sub-field used in the TYPE A and TYPE B combination is smaller than the modulo address sub-field used in the TYPE B only servo field. Consequently, line 330 is positioned below the maximum velocity for TYPE B only servo fields curve 320.

In general, for a maximum deceleration constant $K_d$ (meter/seconds$^2$) and a time delay p between two consecutive samples (In FIG. 10, $p=t_{n+1}-t_n$), the acceleration/deceleration ramp profiles are selected so that in the worst case sampling error, i.e., the sample at time $t_n$ just misses switch velocity point 325-S for deceleration ramp profile 325, deceleration constant $K_d$ is large enough to stop the actuator, as shown by deceleration ramp profile 325A, when actual switch point 325A-S is sampled at $t_{n+1}$. The key is that given constant $K_d$, switch point velocity 325-S is set at one sample before the sample at which deceleration must begin so as to stop at track $tr_{short}$. While the curves in FIG. 10 represent a particular number of servo fields in a track, the results are illustrative of typical results for an arbitrary number of servo fields per track.

Hence, according to the principles of this invention, servo fields of differing lengths are interleaved in each track of the disk. The servo fields are chosen to provide a high seek sampling rate in comparison to the required performance and a reduction in the servo overhead. Moreover, for a given density, a servo system with TYPE A and TYPE B servo fields has more samples per track than a servo system with only TYPE A servo fields. This increased sampling enhances the track following performance of the servo system with the two different types of servo fields over the servo system with only TYPE A servo fields. The increased track following sampling makes the read/write head less likely to move off track in response to external forces on the disk drive. Therefore, disk drives with different types of servo fields interleaved so that track position sampling is enhanced are particularly well-suited for small portable computers.

The following examples illustrate more fully the reductions in servo overhead that may be obtained using the principles of this invention. In each example, there are 2n servo fields in each track and 2n is taken as 66. Also, the advantages of the asymmetrical position sub-field are not utilized so that even further reductions in servo overhead are possible. In each example, one frame (fr.) equals one byte.

EXAMPLE 1

Each track of the disk contains 66 TYPE A servo fields 210 so that there are 66 samples for both seeks and track following per track. This is similar to the high performance system illustrated in FIG. 10.

TABLE 5

| Size of servo fields |
|---|
| 66 sample embedded servo system |
| 20 frames in AGC and MARK sub-fields 201, 202 |
| 16 frames in position sub-field 206 |
| 4 frames in SYNC, INTG and S/I sub-fields 203, 204, 205 |
| 11 frames full address 207 |
| 4 frames write splice |
| 256 bytes data sectors |
| 20% controller overhead |
| Inner track length 3.25" inches @ ID = 1.03" |

TABLE 6

SERVO OVERHEAD USING ONLY TYPE A SERVO FIELDS

| | | |
|---|---:|---|
| DATA FIELD: 256 × 1.2 = | 307 | fr. |
| TYPE A SERVO FIELD: | 55 | fr. |
| | | |
| AGC, MARK | 20 | fr. |
| POSITION | 16 | fr. |
| SYNC,INTG,S/I | 4 | fr. |
| FULL ADDRESS | 11 | fr. |
| WS | 4 | fr. |
| | | |
| SERVO FIELD TOTAL | 55 | fr. |
| FRAMES PER TYPE A SERVO SECTOR | 362 | fr. |
| FRAMES PER TRACK 362 × 66 = | 23,892 | fr. |
| SERVO FIELD FRAMES PER TRACK 55 × 66 = | 3,630 | fr. |
| BITS PER TRACK 23,892 × 8 = | 191,136 | bits |
| SERVO OVERHEAD 3,630/23,892 × 100 = | 15.2 | % |
| BPI @ ID = 1.03" 191,136/3.25 = | 58,811 | bpi |

EXAMPLE 2

In this example, TYPE A, B and C servo fields are interleaved in each track as illustrated in FIG. 3A. TYPE B modulo servo fields have a 2:1 interleave and TYPE C position only servo fields have a 2:1 interleave. Thus, for sixty-six sectors per track, each track of the disk contains one TYPE A servo fields 210, 32 TYPE B servo fields 220 and 33 TYPE C servo fields. There are 33 samples per track for seeks and 66 samples for track following.

TABLE 7

Size of servo fields

66 sample embedded servo system
20 frames in AGC and MARK sub-fields 201, 202
16 frames in position sub-field 206
4 frames in SYNC, INTG and S/I sub-fields 203, 204, 205
11 frames full address 207
5 frames modulo address 208
4 frames write splice
256 bytes data sectors
20% controller overhead
Inner track length 3.25" inches @ ID = 1.03"

TABLE 8

SERVO OVERHEAD USING INTERLEAVED TYPE A, B, & C SERVO FIELDS

| | | |
|---|---:|---|
| DATA FIELD: 256 × 1.2 = | 307 | fr. |
| TYPE A SERVO FIELD: | 55 | fr. |
| | | |
| FRAMES PER TYPE A SERVO SECTOR | 362 | fr. |
| DATA FIELD: 256 × 1.2 = | 307 | fr. |
| TYPE B SERVO FIELD: | 49 | fr. |
| | | |
| AGC, MARK | 20 | fr. |
| POSITION | 16 | fr. |
| SYNC,INTG,S/I | 4 | fr. |
| MODULO ADDRESS | 5 | fr. |
| WS | 4 | fr. |
| | | |
| SERVO FIELD TOTAL | 49 | fr. |
| FRAMES PER TYPE B SERVO SECTOR | 356 | fr. |
| DATA FIELD: 256 × 1.2 = | 307 | fr. |
| TYPE C SERVO FIELD: | 44 | fr. |
| | | |
| AGC, MARK | 20 | fr. |
| POSITION | 16 | fr. |
| SYNC,INTG,S/I | 4 | fr. |

TABLE 8-continued

SERVO OVERHEAD USING INTERLEAVED TYPE A, B, & C SERVO FIELDS

| | | |
|---|---:|---|
| WS | 4 | fr. |
| | | |
| SERVO FIELD TOTAL | 44 | fr. |
| FRAMES PER TYPE C SERVO SECTOR | 351 | fr. |
| FRAMES PER TRACK | | |
| TYPE A + TYPE B + TYPE C | | |
| 362 × 1 + 356 × 32 + 351 × 33 = | 23,337 | fr. |
| SERVO FIELD FRAMES PER TRACK | | |
| TYPE A + TYPE B + TYPE C | | |
| 55 × 1 + 49 × 32 + 44 × 33 = | 3,075 | fr. |
| BITS PER TRACK 23,337 × 8 = | 186,696 | bits |
| SERVO OVERHEAD 3,075/23,337 × 100 = | 13.2 | % |
| BPI @ ID = 1.03" 186,696/3.25 = | 57,445 | bpi |

EXAMPLE 3

In this example, TYPE A, B and C servo fields are interleaved in each track as illustrated in FIG. 3B. TYPE B modulo servo fields have a 3:1 interleave and TYPE C position only servo fields have a 3:2 interleave. Thus, for sixty-six sectors per track, each track of the disk contains two TYPE A servo fields 200, 20 TYPE B servo fields 210 and 44 TYPE C servo fields 220. There are 22 samples per track for seeks and 66 samples for track following. The size of the servo fields are given in TABLE 7.

TABLE 9

SERVO OVERHEAD USING INTERLEAVED TYPE A, B, & C SERVO FIELDS

| | | |
|---|---:|---|
| DATA FIELD: 256 × 1.2 = | 307 | fr. |
| TYPE A SERVO FIELD: | 55 | fr. |
| | | |
| FRAMES PER TYPE A SERVO SECTOR | 362 | fr. |
| DATA FIELD: 256 × 1.2 = | 307 | fr. |
| TYPE B SERVO FIELD: | 49 | fr. |
| | | |
| FRAMES PER TYPE B SERVO SECTOR | 356 | fr. |
| DATA FIELD: 256 × 1.2 = | 307 | fr. |
| TYPE C SERVO FIELD: | 44 | fr. |
| | | |
| FRAMES PER TYPE C SERVO SECTOR | 351 | fr. |
| FRAMES PER TRACK | | |
| TYPE A + TYPE B + TYPE C | | |
| 362 × 2 + 356 × 20 + 351 × 44 = | 23,288 | fr. |
| SERVO FIELD FRAMES PER TRACK | | |
| TYPE A + TYPE B + TYPE C | | |
| 55 × 2 + 49 × 20 + 44 × 44 = | 3,026 | fr. |
| BITS PER TRACK 23,288 × 8 = | 186,304 | bits |
| SERVO OVERHEAD 3,026/23,288 × 100 = | 13.0 | % |
| BPI @ ID = 1.03" 186,696/3.25 = | 57,324 | bpi |

EXAMPLE 4

Figure 11:
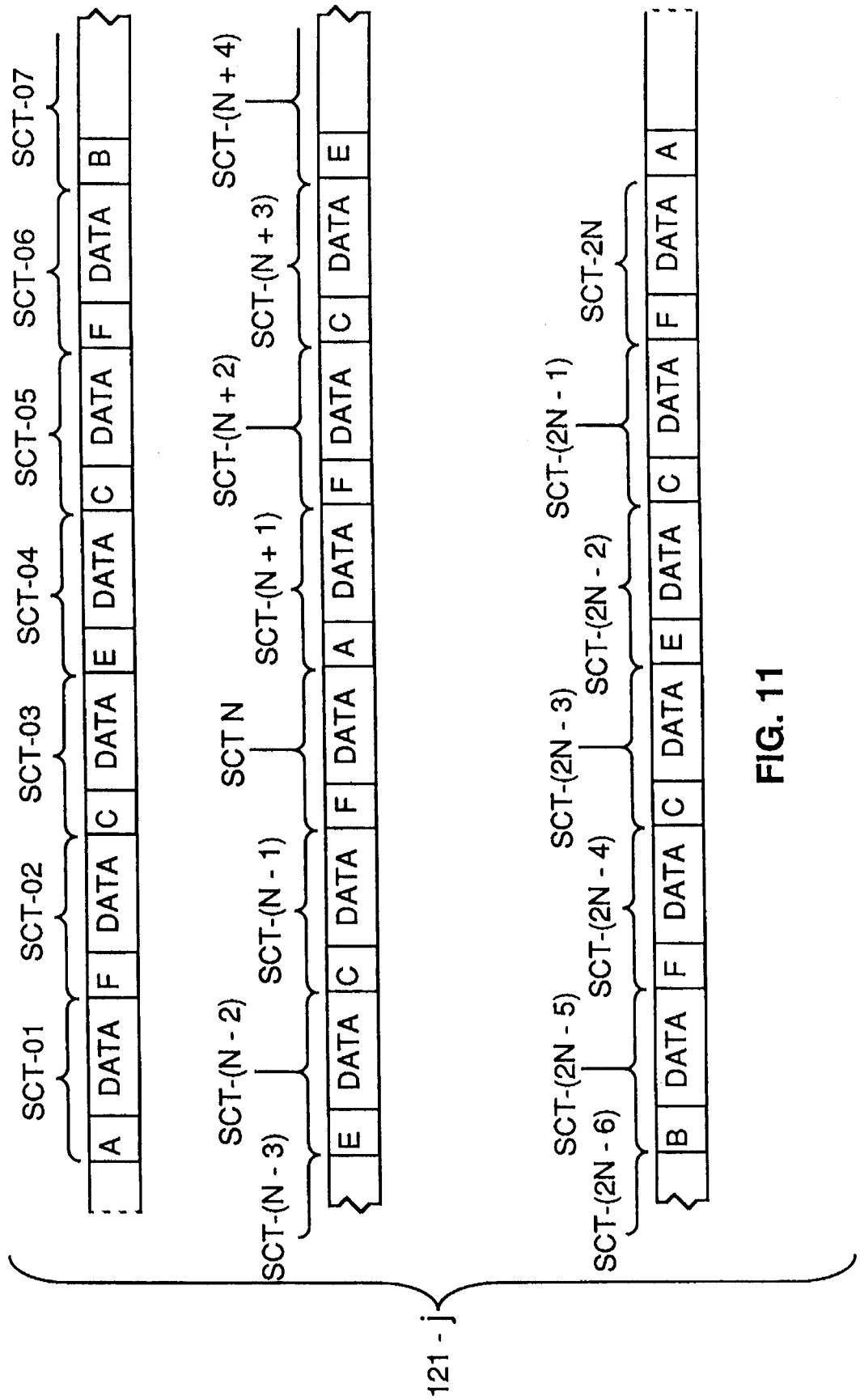
FIG. 11 is a linear representation of three portions of a representative circular track 121-k having TYPE A, B, C, D, E, and F servo fields interleaved where TYPE B and E modulo servo fields combined have a 3:1 interleave and TYPE C and F position only servo fields combined have a 3:2 interleave, according to the principles of this invention.

In this example, TYPE A, B, C, D, E, and F servo fields are interleaved in each track as illustrated in FIG. 11. TYPE B and E modulo servo fields combined have a 3:1 interleave and TYPE C and F position only servo fields combined have a 3:2 interleave. Thus, for sixty-six sectors per track, each track of the disk contains one TYPE A servo fields 200, 10 TYPE B servo fields 210, 22 TYPE C servo fields 220, one TYPE D servo fields 230, 10 TYPE E servo fields 240, 22 TYPE F servo fields 250. There are still 22 samples per track for seeks and 66 samples for track following, but the servo overhead is further limited by eliminating AGC sub-field 201 from one half of the servo fields. The size of the servo fields are given in TABLE 7.

TABLE 10

SERVO OVERHEAD USING SIX INTERLEAVED SERVO FIELD TYPES

| | | | |
|---|---|---|---|
| DATA FIELD: 256 × 1.2 = | | 307 | fr. |
| TYPE A SERVO FIELD: | | 55 | fr. |
| FRAMES PER TYPE A SERVO SECTOR | | 362 | fr. |
| DATA FIELD: 256 × 1.2 = | | 307 | fr. |
| TYPE B SERVO FIELD: | | 49 | fr. |
| FRAMES PER TYPE B SERVO SECTOR | | 356 | fr. |
| DATA FIELD: 256 × 1.2 = | | 307 | fr. |
| TYPE C SERVO FIELD: | | 44 | fr. |
| FRAMES PER TYPE C SERVO SECTOR | | 351 | fr. |
| DATA FIELD: 256 × 1.2 = | | 307 | fr. |
| TYPE D SERVO FIELD: | | 39 | fr. |
| MARK | 4 | | fr. |
| POSITION | 16 | | fr. |
| SYNC,INTG,S/I | 4 | | fr. |
| FULL ADDRESS | 11 | | fr. |
| WS | 4 | | fr. |
| SERVO FIELD TOTAL | 39 | | fr. |
| FRAMES PER TYPE D SERVO SECTOR | | 346 | fr. |
| DATA FIELD: 256 × 1.2 = | | 307 | fr. |
| TYPE E SERVO FIELD: | | 33 | fr. |
| MARK | 4 | | fr. |
| POSITION | 16 | | fr. |
| SYNC,INTG,S/I | 4 | | fr. |
| MODULO ADDRESS | 5 | | fr. |
| WS | 4 | | fr. |
| SERVO FIELD TOTAL | 33 | | fr. |
| FRAMES PER TYPE E SERVO SECTOR | | 340 | fr. |
| DATA FIELD: 256 × 1.2 = | | 307 | fr. |
| TYPE F SERVO FIELD: | | 28 | fr. |
| MARK | 4 | | fr. |
| POSITION | 16 | | fr. |
| SYNC,INTG,S/I | 4 | | fr. |
| WS | 4 | | fr. |
| SERVO FIELD TOTAL | 28 | | fr. |
| FRAMES PER TYPE C SERVO SECTOR | | 335 | fr. |
| FRAMES PER TRACK | | | |
| TYPE A + TYPE B + TYPE C + | | | |
| 362 × 1 + 356 × 10 + 351 × 22 + | | | |
| TYPE D + TYPE E + TYPE F | | | |
| 346 × 1 + 340 × 10 + 335 × 22 = | | 22,850 | fr. |
| SERVO FIELD FRAMES PER TRACK | | | |
| TYPE A + TYPE B + TYPE C + | | | |
| 55 × 1 + 49 × 10 + 44 × 22 + | | | |
| TYPE D + TYPE E + TYPE F | | | |
| 39 × 1 + 33 × 10 + 28 × 22 = | | 2,498 | fr. |
| BITS PER TRACK 22,850 × 8 = | | 182,800 | bits |
| SERVO OVERHEAD 2,498/22,850 × 100 = | | 10.9 | % |
| BPI @ ID = 1.03" 182,800/3.25 = | | 56,246 | bpi |

EXAMPLE 5

Figure 12:
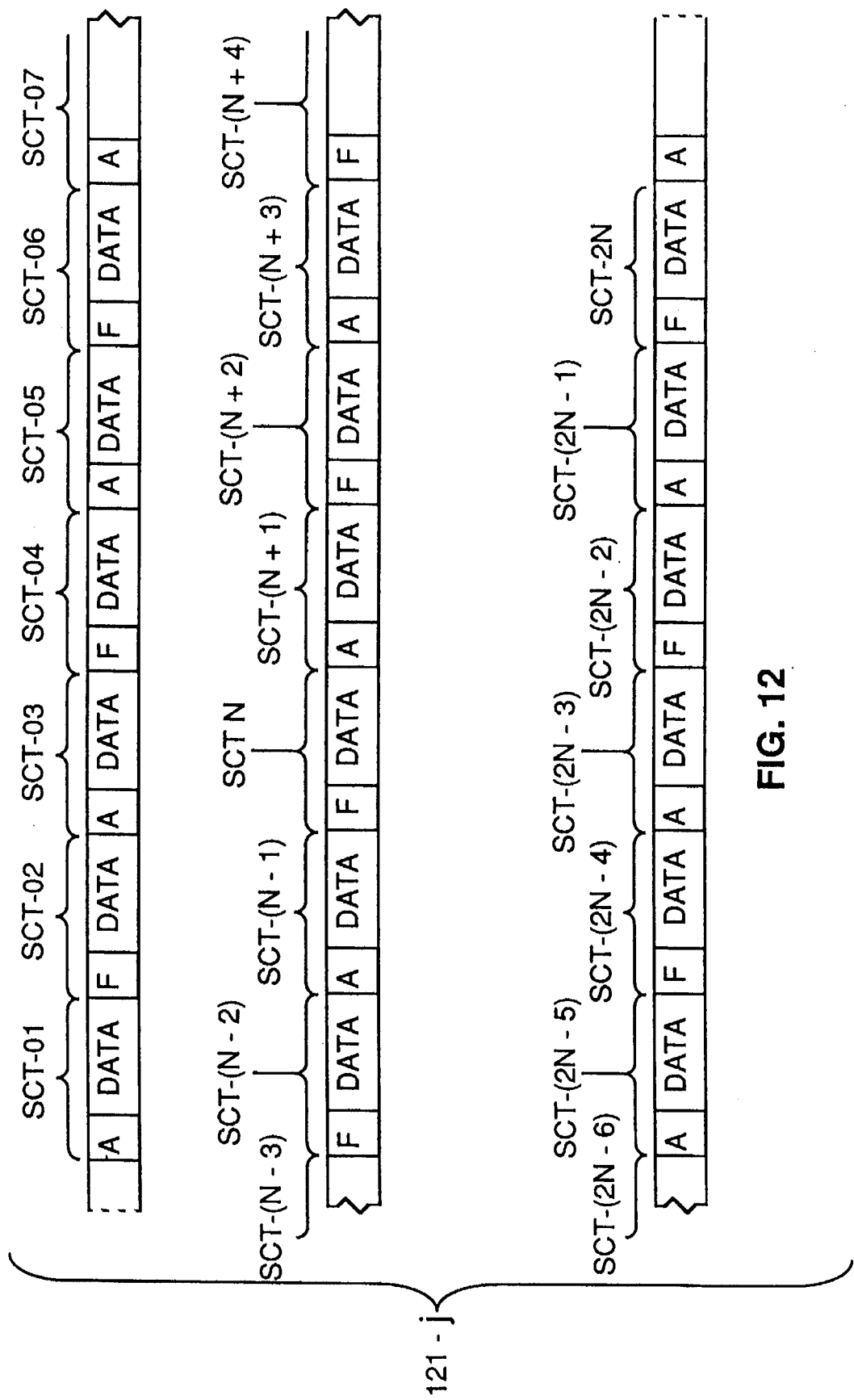
FIG. 12 is a linear representation of three portions of a representative circular track 121-m having interleaved TYPE A and F servo fields according to the principles of this invention.

In this example, TYPE A and F servo fields are interleaved in each track as illustrated in FIG. 12. There are 33 samples per track for seeks and 66 samples for track following, but the servo overhead is limited by eliminating AGC sub-field 201 from one half of the servo fields. The size of the servo fields are given in TABLE 7.

TABLE 11

SERVO OVERHEAD USING ONLY TYPE A AND F SERVO FIELDS

| | | |
|---|---|---|
| DATA FIELD: 256 × 1.2 = | 307 | fr. |
| TYPE A SERVO FIELD: | 55 | fr. |
| FRAMES PER TYPE A SERVO SECTOR | 362 | fr. |
| DATA FIELD: 256 × 1.2 = | 307 | fr. |
| TYPE F SERVO FIELD: | 28 | fr. |
| FRAMES PER TYPE C SERVO SECTOR | 335 | fr. |
| FRAMES PER TRACK | | |
| TYPE A + TYPE F | | |
| 362 × 33 + 335 × 33 = | 23,001 | fr. |
| SERVO FIELD FRAMES PER TRACK | | |
| TYPE A + TYPE F | | |
| 55 × 33 + 28 × 33 = | 2,739 | fr. |
| BITS PER TRACK 23,001 × 8 = | 184,008 | bits |
| SERVO OVERHEAD 2,739/23,001 × 100 = | 11.9 | % |
| BPI @ ID = 1.03" 184,008/3.25 = | 56,618 | bpi |

In each of the interleaved examples, the overhead has been reduced in comparison to a disk having only TYPE A servo fields. The above examples are illustrative only of the principles of this invention and are not intended to limit the invention to the embodiments described. For example, longer or smaller data regions may be used and the position sub-field or other sub-fields may be changed in size or even eliminated.

According to the principles of this invention, a method is provided for determining the number of each type of servo field in a track. Initially, a period f of servo fields with a full track address sub-field, e.g., TYPE A and TYPE D servo fields, within the track is selected. This type of servo field occurs every f servo field positions.

In one embodiment, period f is determined using the acceleration and deceleration curves of the actuator. For curve 315 (FIG. 10), a point 326-S is selected such that as soon as the velocity represented by point 326-S is sampled, the actuator is decelerated so that the read/write head is positioned at track $tr_{stop}$. Point 326-S is also selected such that if the sampling just misses that velocity, the subsequent sample is not later than the velocity at point 326A-S. Point 326A-S is selected such that the maximum velocity range is not reached. Recall that above line 330, only servo fields with a full track address sub-field are sampled.

Time $t_m$ is the time at which velocity 326-S is reached on the acceleration curve and time $t_{m+1}$ is the time at which velocity 326A-S is reached. Period f (in units of time) is the distance between time $t_m$ and time $t_{m+1}$, i.e., $(t_{m+1}-t_m)$ is the minimum distance between servo fields with a full track address.

Next, a period u for AGC update is selected. The AGC is updated every u servo fields. The criteria considered in servo field updating were described above.

Finally, a period m of servo fields with a modulo track address sub-field, e.g., TYPE B and TYPE E servo fields, within the track is selected. The servo field with the modulo track address sub-field occurs every m servo fields between two servo fields with a full track address sub-field.

Assume that (i) the velocity of the actuator is "v" inches per second when the sampling switches from servo fields with both full track and modulo track address sub-fields to only servo fields with a full track address sub-field (velocity v is represented by line 330 (FIG. 10)); (ii) the number of bits in the modulo track address is "y"; and (iii) the maximum distance between any pair of servo fields containing a modulo track address in the same track is "z" where z is measured in the fractions of the full track length. The tracks per inch on the disk is "T" and the spin motor speed is "R" revolutions per minute (RPM).

Following the derivation for expressions (1) through (6) above $$z \leq (1/60)*(R/T)*(1/v)*2^y$$

and $$m \leq int[((\text{Track length})/f)*(1/z)]+1$$

where int[a/b]=integer in the quotient of the division of a/b. Thus, m is selected using the track length, period f and fraction z.

For a given number of servo fields N per track, the number of full servo fields with a full track address sub-field F is the integer value of the number of servo fields per track N divided by period f plus one, i.e., $$F=int[N/f]+1$$

The number of servo fields per track M with a modulo track address sub-field is the integer value of the remainder of the division of the number N by the period f divided by the period m plus the product of the number of servo fields with a full track address sub-field F and the integer value of the number of servo fields per track N divided by period f, i.e., $$M=\{int[N/f]+1\}*\{int[N/f]\}+int[rem[N/f]/m]$$

where rem[a/b] represents the remainder of the division of a by b.

The number of servo fields per track P with no address sub-field is the total number of servo fields per track N minus the number of servo fields per track F with a full track address sub-field minus the number of servo fields per track M with a modulo track address sub-field, e.g., $$P=N-F-M$$

Finally, the number of servo fields per track U with an AGC sub-field is the integer value of number of servo fields per track N divided by period U plus one, i.e., $$U=int[N/u]+1$$

Thus, this method completely defines the number and type of servo fields per track for the selected values of N, f, m and u. Moreover, this method defines the interleave of the different types of servo fields. In one embodiment, only the number N and the periods f and m are used to determine the number F of servo fields with a full track address and the number M of servo fields with a modulo track address as just described.

The electronic circuitry used to drive actuator 104 based upon the different length embedded servo fields of this invention is similar to the circuitry used in prior art systems except, as explained more completely below, a means for storing the AGC level is provided for use with servo fields that do not contain an AGC sub-field.

For this servo system with multiple servo field types, a map of the disk servo fields are maintained in memory by the disk drive and this map is used in conjunction with the servo field information read from the disk to control operation of the disk drive. In view of the above description of the embedded servo fields of this invention, the other electronic circuitry required to convert the prerecorded information in the servo fields into electronic signals to drive the actuator will be apparent to those skilled in the art. Hence, the electronic circuitry (FIG. 1) used with the embedded servo system is only briefly described.

The electronic circuitry includes a preamplifier 105 that receives the signals from read/write head 102. One preamplifier suitable for use with the embedded servo system is available from Silicon Systems, Inc. of Tustin, CA as part no. 32R2030. The output signals from preamplifier 105 drives read/write combo circuit 106 which is illustrated in more detail in FIG. 13. In one embodiment, the read/write combo circuit is an integrated circuit available from National Semiconductor, Inc. of Santa Clara, Calif. as part number DP8491.

Figures 1, 13:
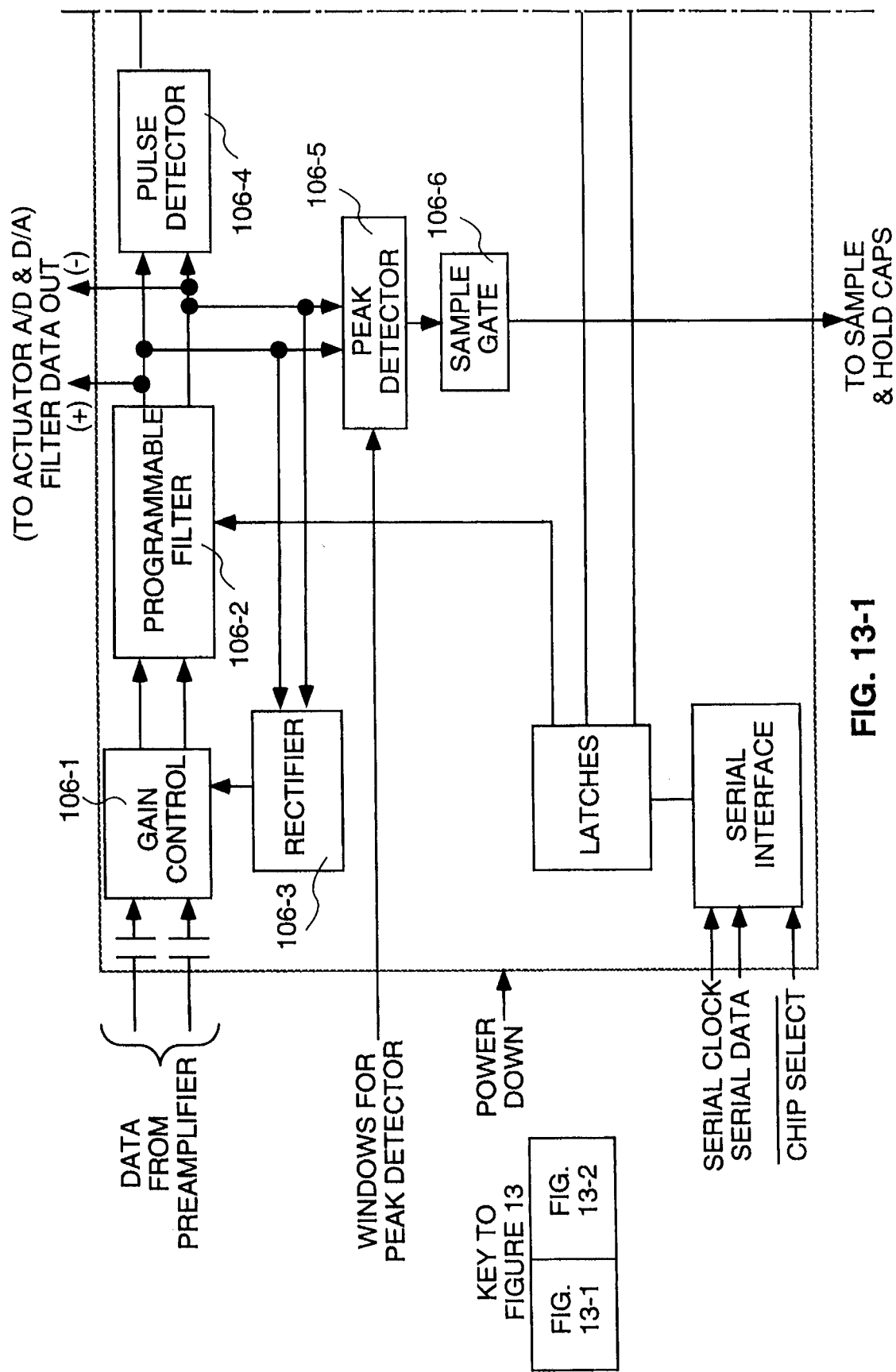
FIG. 13, as shown in FIGS. 31-1 to 13-2, is a block diagram of one embodiment of a read/write combo circuit suitable for use in a disk drive having the novel interleaved embedded servo system of this invention.
Figures 2, 13:
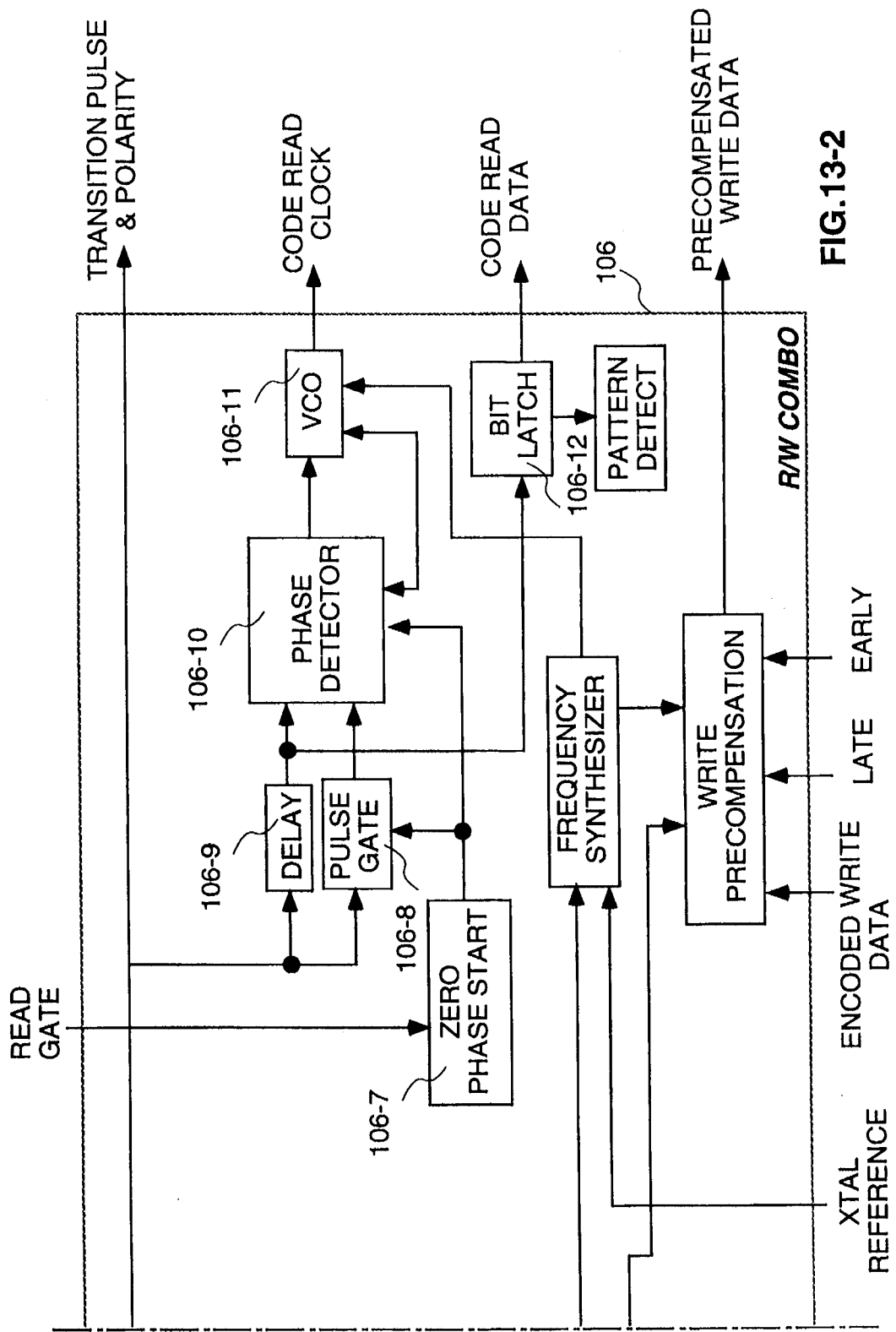

Read/write combo circuit 106, in response to analog data from read/write preamp 105, provides automatic gain adjusted signals through programmable filter 106-2 to an internal pulse detector 106-4 (FIG. 13). The signals into pulse detector 106-4 generate a transition pulse and polarity signal for gate array 111 (FIG. 14) which in turn generates a signal used to determine the window for Gray address separator 111-14.

Read/write combo circuit 106 also includes a delay circuit 106-9 and a pulse gate circuit 106-8 that each generate a signal in response to the signal from pulse detector 106-4. In response to a read gate signal, zero phase start provides a signal to phase detector circuit 106-10 and pulse gate circuit 106-8. The output signals from circuits 106-7 and 106-8 also drive phase detector circuit 106-10. AVCO circuit 106-11 in response to the output signal of phase detector 106-10 generates a code read clock signal. In response to a signal from delay circuit 106-9, bit latch circuit 106-12 provides a code read data signal.

Gate array 111 (FIG. 14) is described more completely Ser. in copending and commonly assigned U.S. patent application No. 07/629,948 of Morehouse et al. filed on Dec. 19, 1990 and entitled "Miniature Hard Disk Drive For Portable Computers," now abandoned which is incorporated herein by reference in its entirety.

Figures 2, 14:
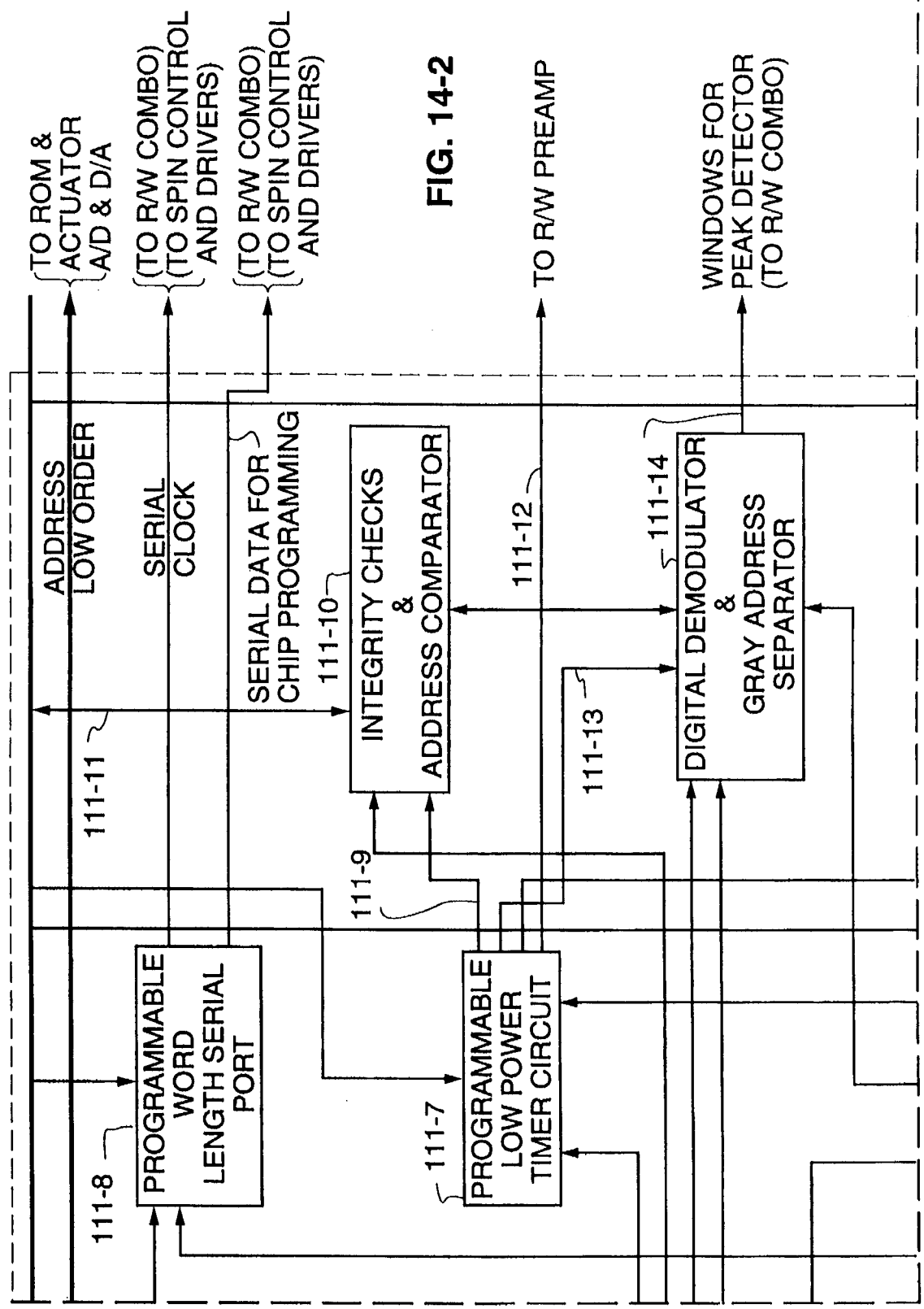
FIG. 14, as shown in FIGS. 14-1 to 14-4, is a block diagram of one embodiment of a gate array suitable for use in a disk drive having the novel interleaved embedded servo system of this invention.
Figures 3, 14:
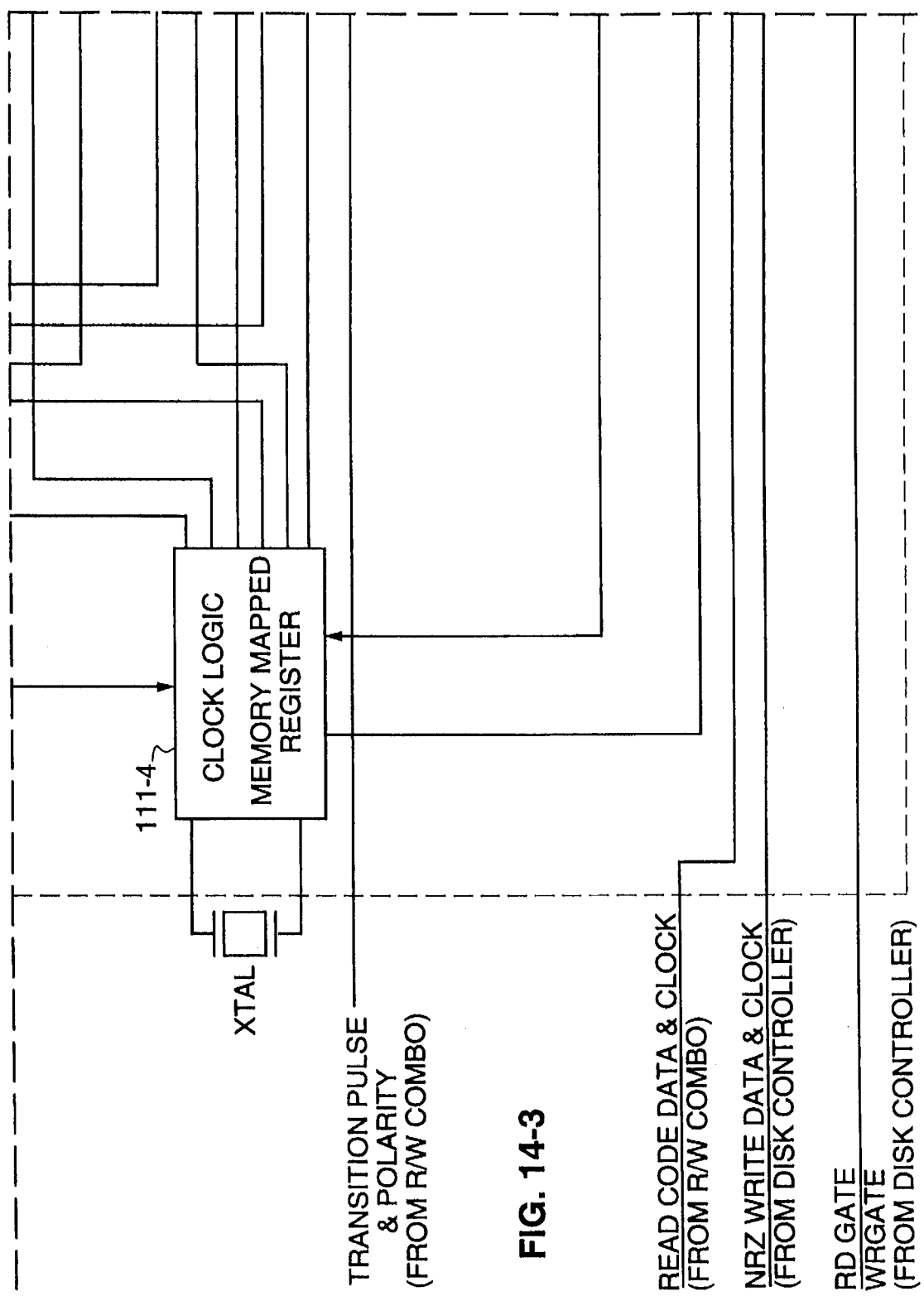
Figures 4, 14:
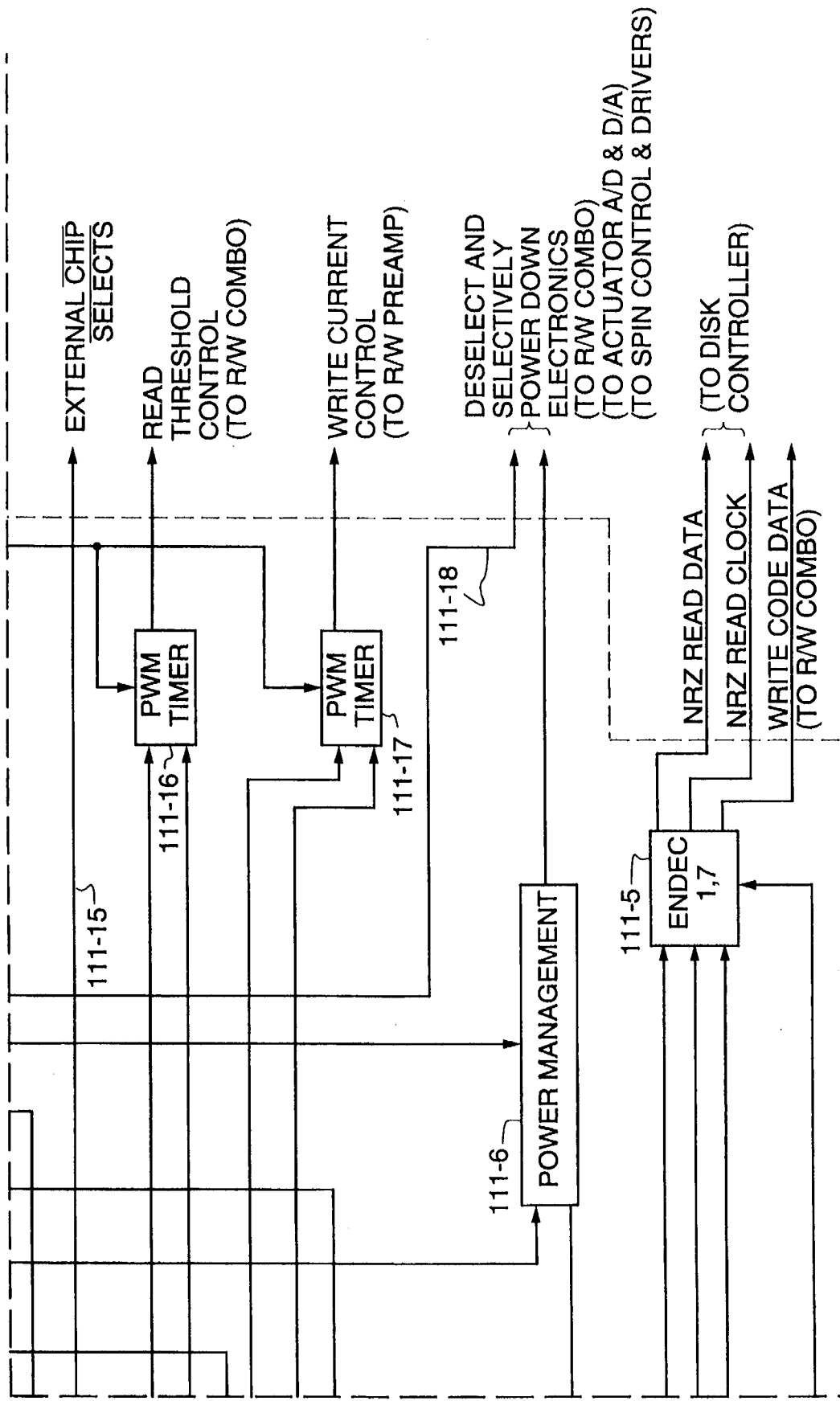
Figure 15:
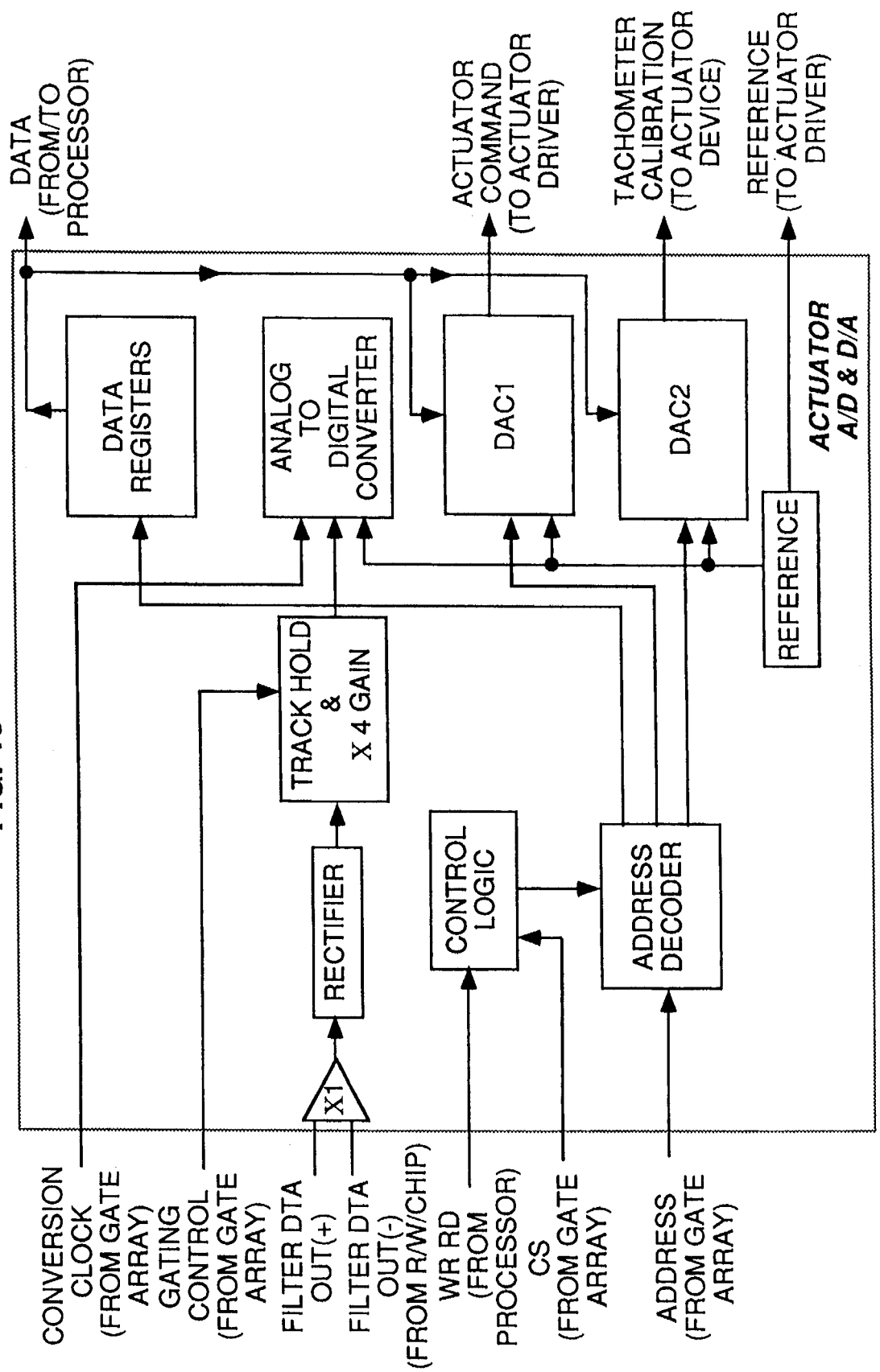
FIG. 15 is a block diagram of one embodiment of an actuator A/D and D/A circuit suitable for use in a disk drive having the novel interleaved embedded servo system of this invention.

In actuator A/D and D/A circuit 112 (FIG. 15), the filtered signals from read/write combo circuit 106 are first passed through a unity gain differential amplifier 12-1 and then rectified by rectifier 112-2. The output signal from rectifier is sampled by track hold circuit 112-3 which contains four sample and hold circuits at predetermined times, that are controlled by gating control line 112-7 from gate array 111 (FIG. 14). The four signals from track hold circuit 112-3 are sequentially converted to digital signals by analog to digital converter 112-4, stored in data registers 112-5, and read by microcontroller 110. The four signals represent the peak voltage levels of the position sub-field $N_a$, $N_b$, $Q_a$, and $Q_b$ waveforms. Microcontroller 110 processes the four signals and computes a position error. Microcontroller 110 then generates a correction signal which is sent through data lines to digital-to-analog converter 112-6 which in turn is converted to an analog signal. The output signal of D/A converter 112-6 is provided to actuator driver circuit 113.

Actuator A/D and D/A circuit 112 also generates a tachometer calibration signal and a reference signal that are provided to actuator driver circuit 113. In one embodiment, actuator circuit 112 is an integrated circuit available from Analog Devices of Norwood, MASS. as part number ADC 7773.

Figures 1, 16:
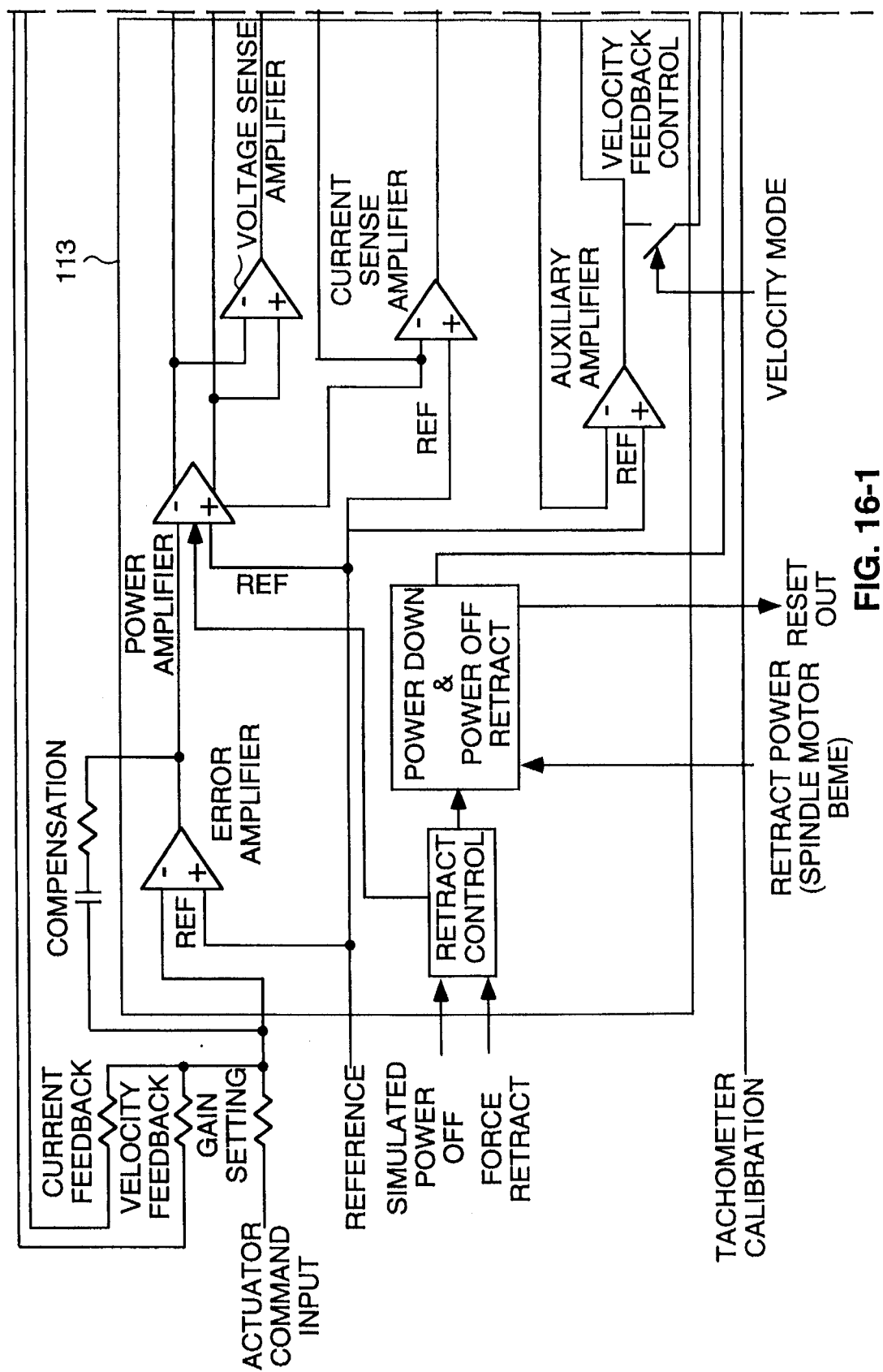
FIG. 16, as shown in FIGS. 16-1 to 16-2, is a block diagram of one embodiment of an actuator driver circuit suitable for use in a disk drive having the novel interleaved embedded servo system of this invention.
Figures 2, 16:
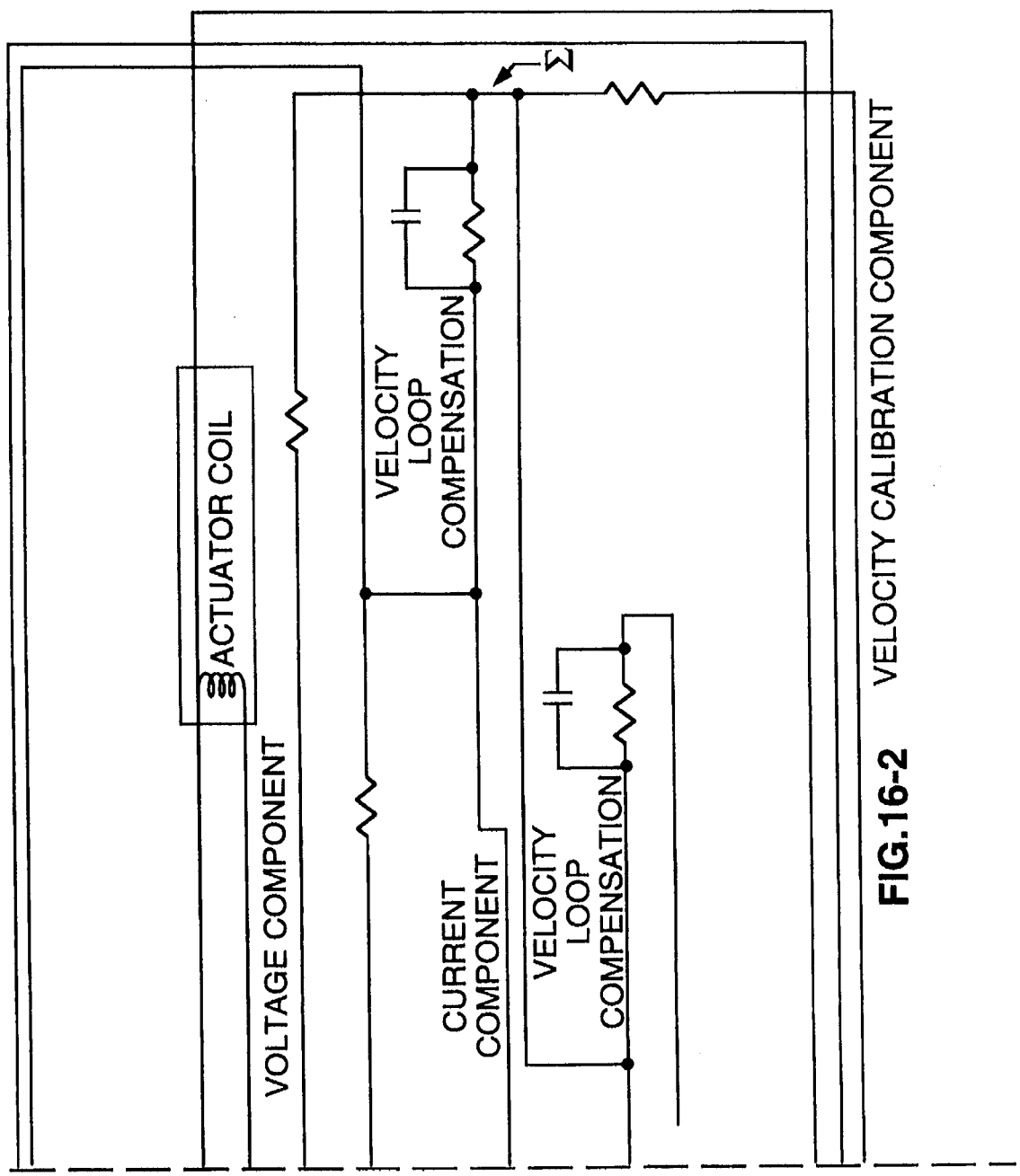

Actuator drive circuit 113 (FIG. 16) in response to the signals from actuator circuit 112 moves the read/write head to the predetermined location over the disk. In one embodiment, actuator driver circuit includes an integrated circuit available from Allegro Micro System, Inc., of Worcester, Mass. as part number 8932.

Figure 17:
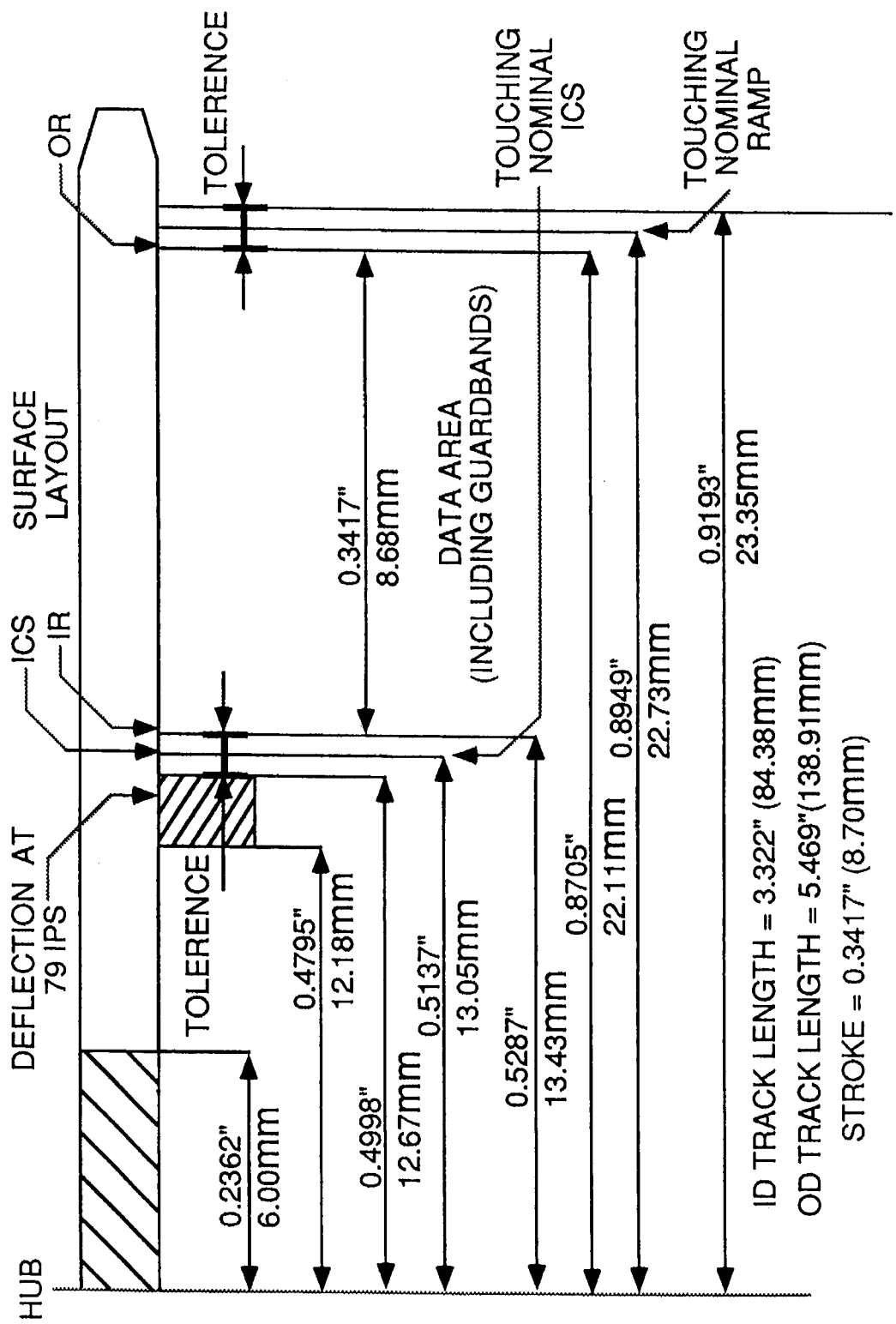
FIG. 17 is a cross-sectional view of one disk on which the prerecorded interleaved embedded servo system of this invention is used

FIG. 17 is a cross-sectional view of a disk on which the prerecorded interleaved embedded servo system of this invention is used. Inter radius IR of the disk data is about 13.4 mm and outer radius OR of the data area is about 22.1 mm. Hence, the data area of the disk including guard bands at the inner and outer radii is about 8.7 mm. The disk has a density of about 40,000 bpi and 1550 tracks per inch. The disk is mounted on a hub of about 6 mm in radius. Inner crash stop ICS is at about a radius of 12.7 mm and is nominally touched at a radius of about 13.1 mm. Loading/unloading ramp 103 (FIG. 1) is nominally touched at a radius of about 22.7 mm.

The embodiments described above of an embedded servo system having different types of interleaved servo fields in a track are illustrative only of the principles of this invention and are not intended to limit the scope of the invention to the specific embodiment described. In view of this disclosure, those skilled in the art will be able to define other servo systems with interleaved servo fields so as to achieve the advantages of this invention.

We claim:

1. In a disk drive, an embedded servo system comprising:

a disk having a magnetic medium disposed on a surface and having a plurality of concentric tracks with each track being subdivided into a plurality of servo sectors by prerecorded servo field information, said prerecorded servo field information comprising an asymmetrical position sub-field having:

a plurality of normal frame pairs; and at least one quadrature frame pair;

wherein said plurality of normal frame pairs and said at least one quadrature frame pair are interleaved thereby forming said asymmetrical position sub-field; and a read/write transducer mounted to read said prerecorded servo field information on said disk wherein signals generated by said read/write transducer upon reading asymmetrical position sub-field are used only in positioning said read/write transducer.

2. In a disk drive, an embedded servo system as in claim 1 wherein each pair of said normal frame pairs includes a first frame having a predetermined magnetization Na and a second frame having a different predetermined magnetization Nb.

3. In a disk drive, an embedded servo system as in claim 2 wherein each quadrature frame pair includes a first frame having a predetermined magnetization Qa and a second frame having a different predetermined magnetization Qb.

4. In a disk drive, an embedded servo system as in claim 3 wherein said position sub-field includes a cell having an Na frame, a Qa frame, an Nb frame, and a Qb frame.

5. In a disk drive, an embedded servo system as in claim 3 wherein said position sub-field includes a cell having only an Na frame and an Nb frame.

* * * * *